US008830605B2

(12) United States Patent
Miyamoto et al.

(10) Patent No.: US 8,830,605 B2
(45) Date of Patent: Sep. 9, 2014

(54) LENS UNIT

(75) Inventors: Makoto Miyamoto, Hyogo (JP); Hiroshi Kurumatani, Hyogo (JP); Tadashi Niki, Osaka (JP); Akio Konishi, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/639,505

(22) PCT Filed: Oct. 19, 2011

(86) PCT No.: PCT/JP2011/005853
§ 371 (c)(1), (2), (4) Date: Oct. 4, 2012

(87) PCT Pub. No.: WO2012/056654
PCT Pub. Date: May 3, 2012

(65) Prior Publication Data

US 2013/0027792 A1 Jan. 31, 2013

(30) Foreign Application Priority Data

Oct. 26, 2010 (JP) ................................ 2010-240159

(51) Int. Cl.
*G02B 7/02* (2006.01)

(52) U.S. Cl.
USPC .......................................................... 359/826

(58) Field of Classification Search
USPC .......................................................... 359/826
See application file for complete search history.

(56) References Cited

U.S. PATENT DOCUMENTS

| | | | |
|---|---|---|---|
| 5,613,168 A | 3/1997 | Kawano et al. | |
| 7,515,365 B2 | 4/2009 | Morioka et al. | |
| 7,561,352 B2 | 7/2009 | Dahmen et al. | |
| 7,652,832 B2 | 1/2010 | Brown et al. | |
| 7,995,099 B2 | 8/2011 | Maeda | |
| 2002/0105731 A1 | 8/2002 | Iikawa et al. | |
| 2006/0067082 A1 | 3/2006 | Morioka et al. | |
| 2006/0067802 A1* | 3/2006 | Abel et al. | 410/77 |
| 2006/0291068 A1 | 12/2006 | Dahmen et al. | |
| 2008/0170127 A1 | 7/2008 | Maeda | |
| 2009/0141371 A1 | 6/2009 | Brown et al. | |

FOREIGN PATENT DOCUMENTS

| | | |
|---|---|---|
| CN | 1752839 A | 3/2006 |
| CN | 101221340 A | 7/2008 |
| DE | 102005045364 A1 | 3/2006 |
| EP | 1630580 A1 | 3/2006 |

(Continued)

OTHER PUBLICATIONS

Related co-pending U.S. Appl. No. 13/639,499, filed Oct. 4, 2012.

(Continued)

*Primary Examiner* — James Jones
(74) *Attorney, Agent, or Firm* — Shinjyu Global IP

(57) ABSTRACT

A lens unit has an optical system having at least one lens, a lens holder supporting the optical system and a lens frame having a guide component. The guide component guides a movement of the lens holder in a first direction. The lens holder has a first portion and a second portion. The first portion is disposed slidably over the guide component. The second portion is disposed slidably over the guide component and disposed spaced apart from the first portion in the first direction. The guide component is sandwiched between the first portion and the second portion by an elastic force of the first portion and/or the second portion.

3 Claims, 13 Drawing Sheets

(56) References Cited

FOREIGN PATENT DOCUMENTS

| | | | |
|---|---|---|---|
| EP | 1736810 | A1 | 12/2006 |
| EP | 2065742 | A1 | 6/2009 |
| JP | H01-173007 | A | 7/1989 |
| JP | H02-019106 | U | 2/1990 |
| JP | H06-130268 | A | 5/1994 |
| JP | H07-274214 | A | 10/1995 |
| JP | H07-287153 | A | 10/1995 |
| JP | H08-242468 | A | 9/1996 |
| JP | H10-293240 | A | 11/1998 |
| JP | 2000-261830 | A | 9/2000 |
| JP | 2000-338411 | A | 12/2000 |
| JP | 2002-236243 | A | 8/2002 |
| JP | 2004-302054 | A | 10/2004 |
| JP | 2005-018023 | A | 1/2005 |
| JP | 2005-173270 | A | 6/2005 |
| JP | 2006-039098 | A | 2/2006 |
| JP | 2006-072165 | A | 3/2006 |
| JP | 2006-091461 | A | 4/2006 |
| JP | 2006-154319 | A | 6/2006 |
| JP | 2006-243385 | A | 9/2006 |
| JP | 2010-056865 | A | 3/2010 |

OTHER PUBLICATIONS

International Search Report of PCT Application No. PCT/JP2011/005853.

International Search Report of co-pending PCT Application No. PCT/JP2011/005851.

Office Action for related Japanese Patent Application No. 2012-540664, dated Nov. 12, 2013.

The Office Action from the corresponding Chinese Patent Application No. 201180015511.5 issued on Feb. 27, 2014.

* cited by examiner (A)
(B)
X
Z
Y
36
OL
AL
62
63
82
83
phase P1
phase P2
phase P3
42
64
61
68
88
35L
d

LENS UNIT

BACKGROUND

1. Technical Field

The technology disclosed herein relates to a lens unit having an optical system.

2. Background Art

Lens units having an optical system have been used in many different kinds of device in the past. For instance, a lens unit is installed in a digital camera or other such imaging device.

With this type of lens unit, the position of the lenses included in the optical system in the optical axis direction is sometimes adjusted. For example, with the lens unit discussed in Japanese Laid-Open Patent Application 2006-154319, a screw mechanism is used to adjust the lens position.

SUMMARY

However, with the lens unit discussed in Patent Literature 1, since a screw mechanism is used, there is the risk that the gaps formed between the threads will shift the optical axis of the optical system and will lower the accuracy of position adjustment of the optical system.

It is an object of the technology disclosed herein to provide a lens unit with which the position of an optical system can be adjusted more accurately while the configuration is simplified.

The lens unit disclosed herein has an optical system having at least one lens, a lens holder supporting the optical system and a lens frame having a guide component. The guide component guides a movement of the lens holder in a first direction. The lens holder has a first portion and a second portion. The first portion is disposed slidably over the guide component. The second portion is disposed slidably over the guide component and disposed spaced apart from the first portion in the first direction. The guide component is sandwiched between the first portion and the second portion by an elastic force of the first portion and/or the second portion.

With this lens unit, when the lens holder rotates with respect to the lens frame, the first portion and the second portion slide over the guide component, and the lens holder moves in the optical axis direction with respect to the lens frame according to the shape of the guide component. Providing the first portion and second portion simplifies the configuration for moving the lens holder with respect to the lens frame.

Furthermore, since the guide component is sandwiched between the first portion and the second portion, the position of the lens holder in the optical axis direction with respect to the lens frame tends to be more stable.

As discussed above, with this lens unit the position of an optical system can be adjusted more accurately while the configuration is simplified.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1: Configuration of Camera System

Figure 1:
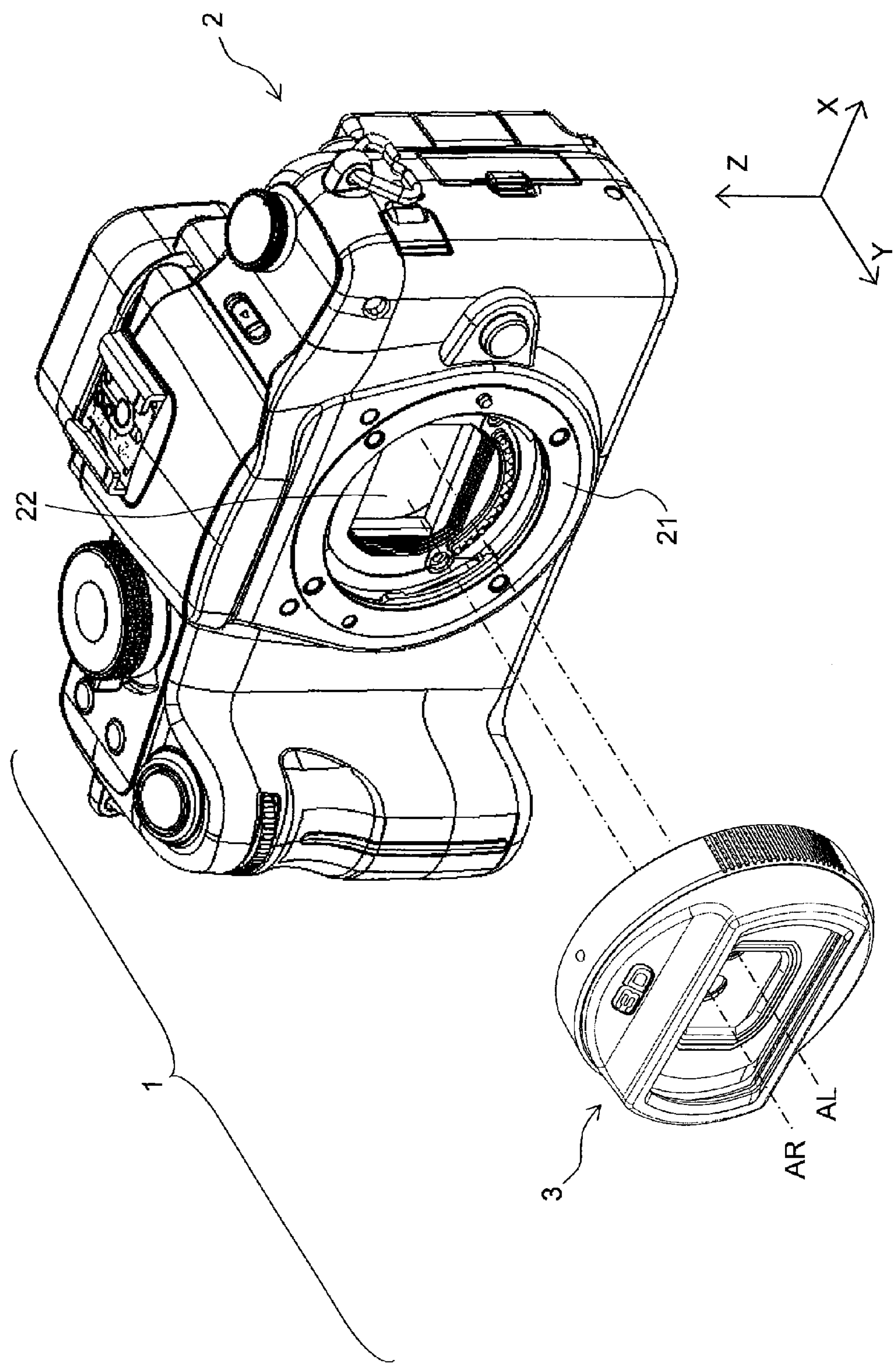
FIG. 1 is an exploded oblique view of a digital camera.
Figure 2:
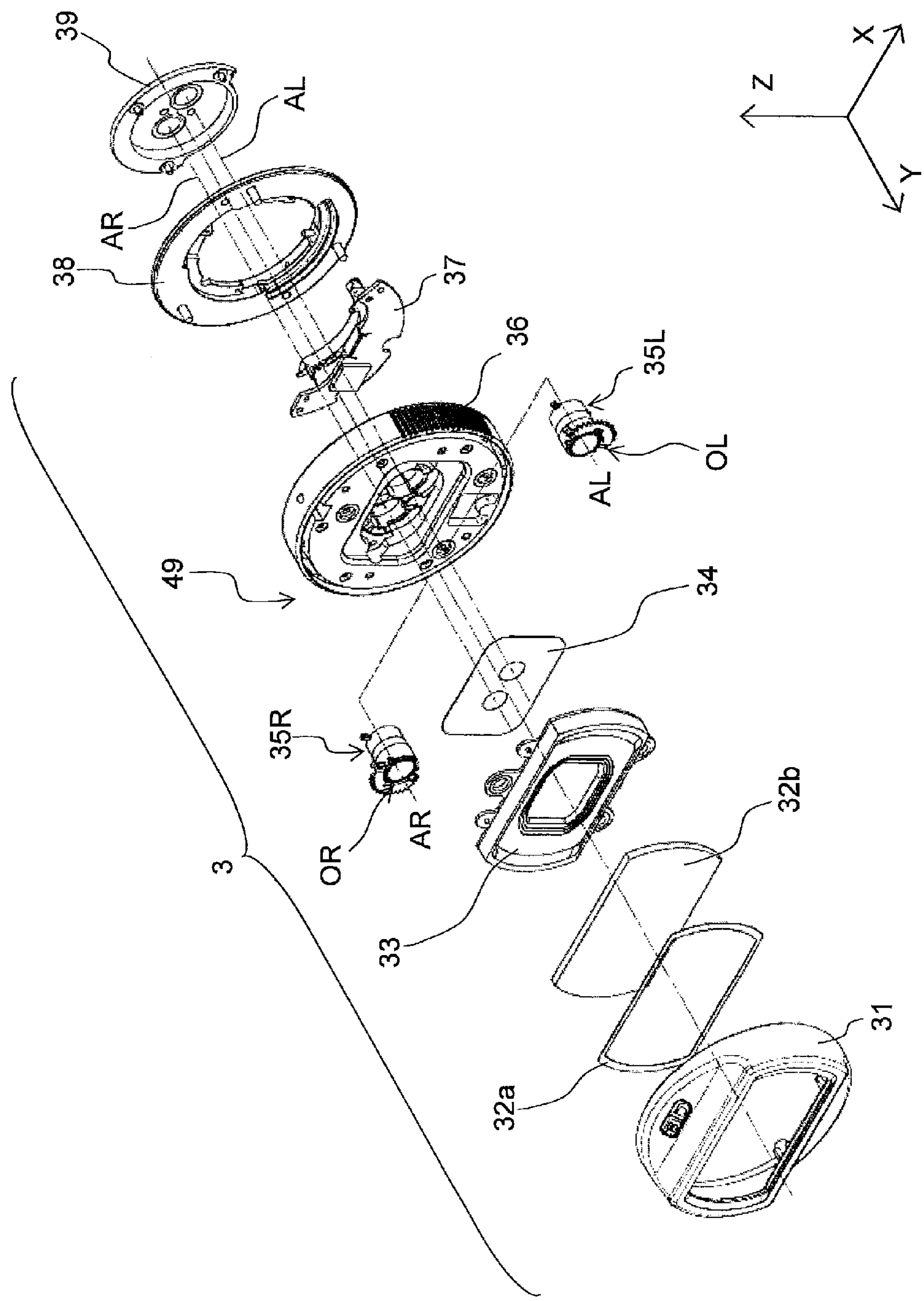
FIG. 2 is an exploded oblique view of an interchangeable lens unit.

The simplified configuration of a digital camera 1 will be described through reference to the drawings. FIG. 1 is an exploded oblique view of a digital camera. FIG. 2 is an exploded oblique view of an interchangeable lens unit.

The digital camera 1 is an imaging device capable of capturing three-dimensional images, and is an interchangeable lens type of digital camera. As shown in FIG. 1, the digital camera 1 comprises an interchangeable lens unit 3 (one example of a lens unit) and a camera body 2 to which the interchangeable lens unit 3 can be mounted. The interchangeable lens unit 3 is a lens unit that is compatible with three-dimensional imaging, and forms optical images of a subject (a left-eye optical image and a right-eye optical image). The camera body 2 is compatible with both two- and three-dimensional imaging, and products image data on the basis of the optical images formed by the interchangeable lens unit 3. An interchangeable lens unit that is not compatible with three-dimensional imaging can also be attached to the camera body 2 instead of the interchangeable lens unit 3 that is compatible with three-dimensional imaging. That is, the camera body 2 is compatible with both two- and three-dimensional imaging.

For the purposes of this description, the subject side of the digital camera 1 will be called the front, the opposite side from the subject will be called the rear or back, the vertically upper side in the normal orientation of the digital camera 1 (hereinafter also referred to as landscape orientation) will be called the top, and the vertically lower side will be called the bottom.

A three-dimensionally perpendicular coordinate system is set up for the digital camera 1. The X axis is set to be parallel to the left and right direction when the digital camera 1 is used. The Y axis is set to be substantially parallel to the optical axes of the digital camera 1 (the left-eye optical axis AL and the right-eye optical axis AR). The Z axis is set to be parallel to the up and down direction (vertical direction) when the digital camera 1 is used. In the following description, the X axis direction shall be a direction parallel to the X axis. The Y axis direction shall be a direction parallel to the Y axis, and is one example of a first direction parallel to the optical axis of the first optical system, and one example of a second direction parallel to the optical axis of the second optical system. The Z axis direction shall be a direction parallel to the Z axis. The left side when facing the subject shall be the X axis direction positive side. The subject side in the Y axis direction shall be the Y axis direction positive side. And the upper side in the Z axis direction shall be the Z axis direction positive side.

As shown in FIG. 1, the camera body 2 has an imaging element 22 and a body mount 21. The imaging element 22 converts the optical images formed by the interchangeable lens unit 3 (left- and right-eye optical images) into electrical signals. Examples of the imaging element 22 include a CCD (charge coupled device) image sensor and a CMOS (complementary metal oxide semiconductor) image sensor. The interchangeable lens unit 3 is mounted to the body mount 21.

The interchangeable lens unit 3 is a lens unit that is compatible with three-dimensional imaging. A juxtaposed imaging system, in which two optical images are formed on a single imaging element 22 by a pair of left and right optical systems, is employed for the interchangeable lens unit 3 in this embodiment.

As shown in FIG. 2, the interchangeable lens unit 3 has a front cover 31, a dust blocking tape 32*a*, a protective glass 32*b*, a field stop 33, a light blocking sheet 34, a left-eye optical system OL, a right-eye optical system OR, an adjustment mechanism 49, a printed board 37, a lens mount 38, and a light blocking frame 39. As will be discussed below, the adjustment mechanism 49 has a left-eye lens holder 35L, a right-eye lens holder 35R, and a lens frame 36.

The left-eye optical system OL (one example of an optical system, and one example of a first or second optical system) has the left-eye optical axis AL (one example of an optical axis, and one example of a first or second optical axis), and forms a left-eye optical image as seen from a first viewpoint (one example of a first or second optical image). The left-eye optical system OL is fixed to the left-eye lens holder 35L. The configuration of the left-eye optical system OL will be discussed below along with that of the left-eye lens holder 35L.

The right-eye optical system OR (one example of an optical system, and one example of a first or second optical system) has the right-eye optical axis AR (one example of an optical axis, and one example of a first or second optical axis), and forms a right-eye optical image as seen from a first viewpoint (one example of a first or second optical image). The right-eye optical system OR is fixed to the right-eye lens holder 35R. The configuration of the right-eye optical system OR will be discussed below along with that of the right-eye lens holder 35R. In this embodiment, the left-eye optical axis AL is disposed parallel to the right-eye optical axis AR, but the left-eye optical axis AL may be disposed substantially parallel to the right-eye optical axis AR.

The light blocking sheet 34 is a part used to block out unnecessary light, and is affixed to the lens frame 36 by adhesive tape or the like. The field stop 33 blocks part of the light flux incident on the middle part of the imaging element 22. More specifically, the field stop 33 blocks part of the light flux incident on the interchangeable lens unit 3 so that the light flux converged by the left-eye optical system OL will not overlap the light flux converged by the right-eye optical system OR, or even if there is some overlap, so that the overlap width will be kept to a minimum. This prevents the optical images formed by the left-eye optical system OL and the right-eye optical system OR from becoming mixed on the imaging element 22. The protective glass 32*b* is provided to prevent dust or dirt from getting into the interchangeable lens unit 3 and to protect the left-eye optical system OL and the right-eye optical system OR. The dust blocking tape 32*a* is provided to prevent dust or dirt from getting into the interchangeable lens unit 3.

The front cover 31 is a housing piece, and is fixed to the lens frame 36 via the dust blocking tape 32*a*, the protective glass 32*b*, and the field stop 33. The printed board 37 and the lens mount 38 are fixed to the rear face side of the lens frame 36. The light blocking frame 39 is a part used to block out unnecessary light, and is fixed to the lens mount 38.

The adjustment mechanism 49 (one example of an adjustment mechanism) is able to separately adjust the position of the left-eye optical system OL in a first direction with respect to the lens frame 36, and the position of the right-eye optical system OR in a second direction with respect to the lens frame 36.

2. Detailed Configuration of Adjustment Mechanism

Figure 3:
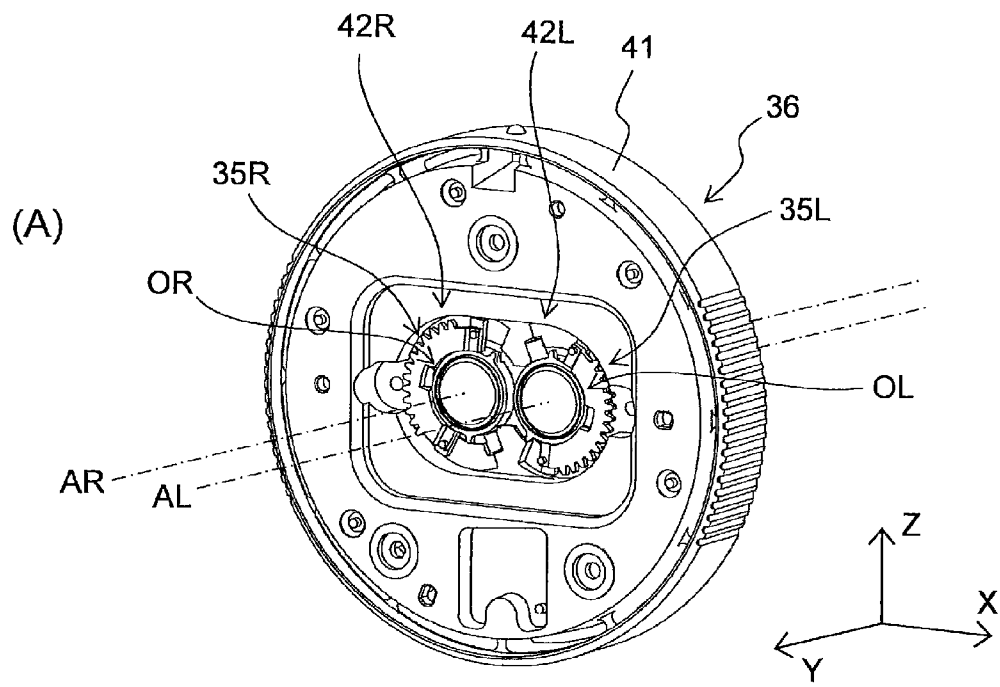
FIG. 3A is an oblique view of an adjustment mechanism.
FIG. 3B is a plan view of the adjustment mechanism (viewed from the imaging element side)
Figure 3:
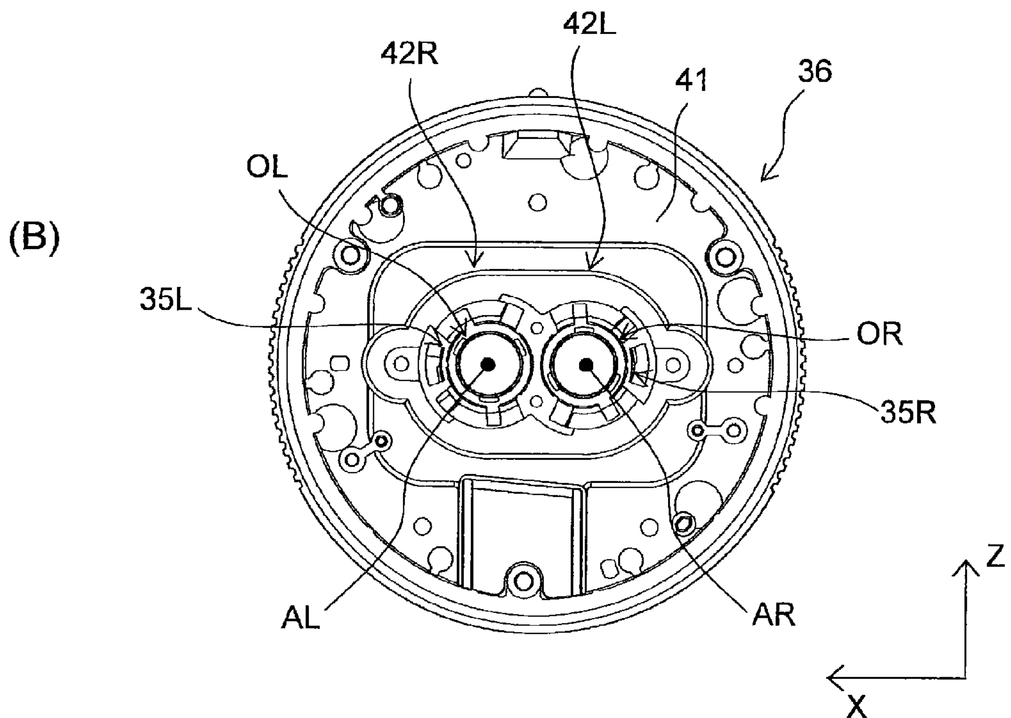
Figure 4:
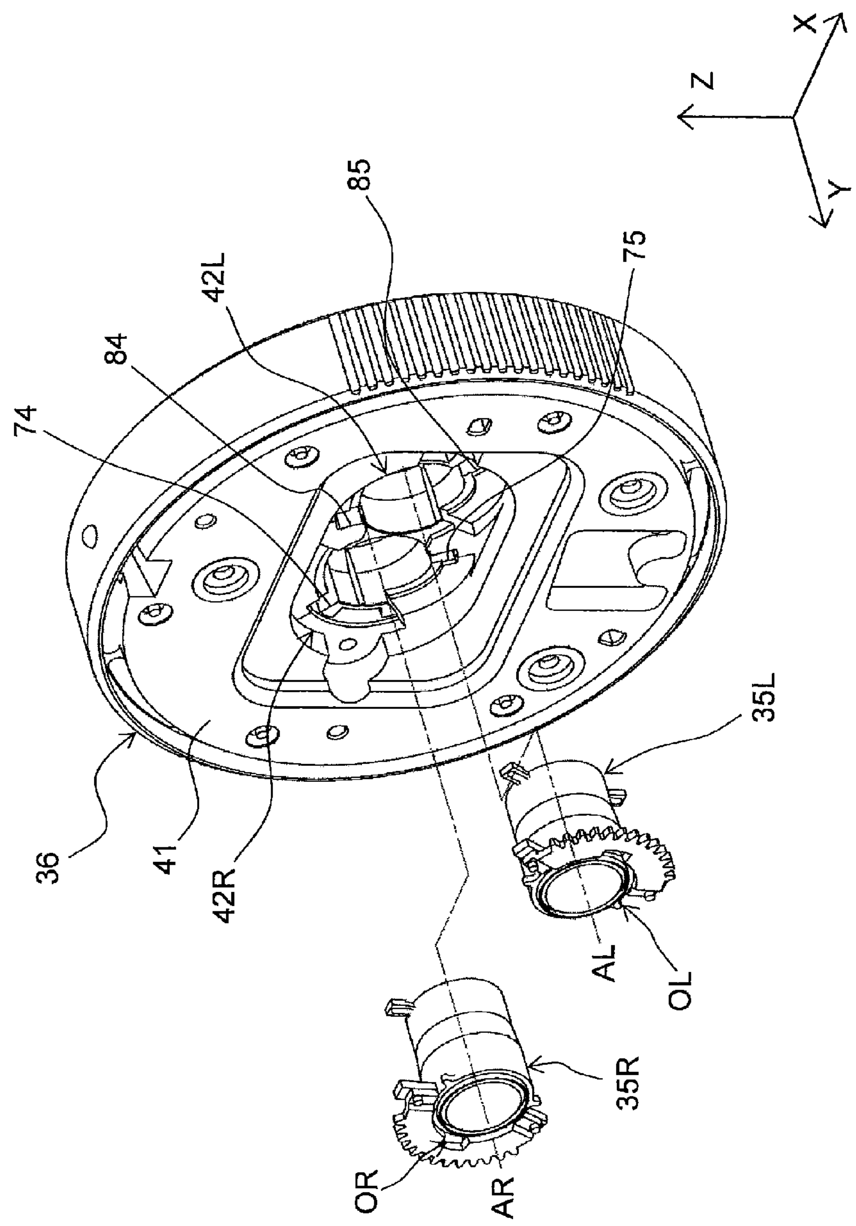
FIG. 4 is an exploded oblique view of the adjustment mechanism.

The detailed configuration of the adjustment mechanism 49 will now be described through reference to the drawings. FIG. 3A is an oblique view of the adjustment mechanism 49, and FIG. 3B is a plan view of the adjustment mechanism 49. FIG. 4 is an exploded oblique view of the adjustment mechanism 49.

As shown in FIGS. 3A, 3B, and 4, the adjustment mechanism 49 has the lens frame 36, the left-eye lens holder 35L, and the right-eye lens holder 35R.

(1) Lens Frame 36

The lens frame 36 (one example of a lens frame) is a single member formed integrally from a resin, for example. As shown in FIGS. 3A, 3B, and 4, the lens frame 36 has a base frame 41, a left-side support component 42L (one example of a guide component, and one example of a first or second support component), and a right-side support component 42R (one example of a guide component, and one example of a first or second support component).

The base frame 41 (one example of a base frame) is a portion that is mounted to the body mount 21 via the lens mount 38, and constitutes the main part of the lens frame 36.

The left-side support component 42L supports the left-eye lens holder 35L. The left-side support component 42L moves in the Y axis direction while rotating with respect to the base frame 41.

The right-side support component 42R supports the right-eye lens holder 35R. The right-side support component 42R moves in the Y axis direction while rotating with respect to the base frame 41.

Figure 5:
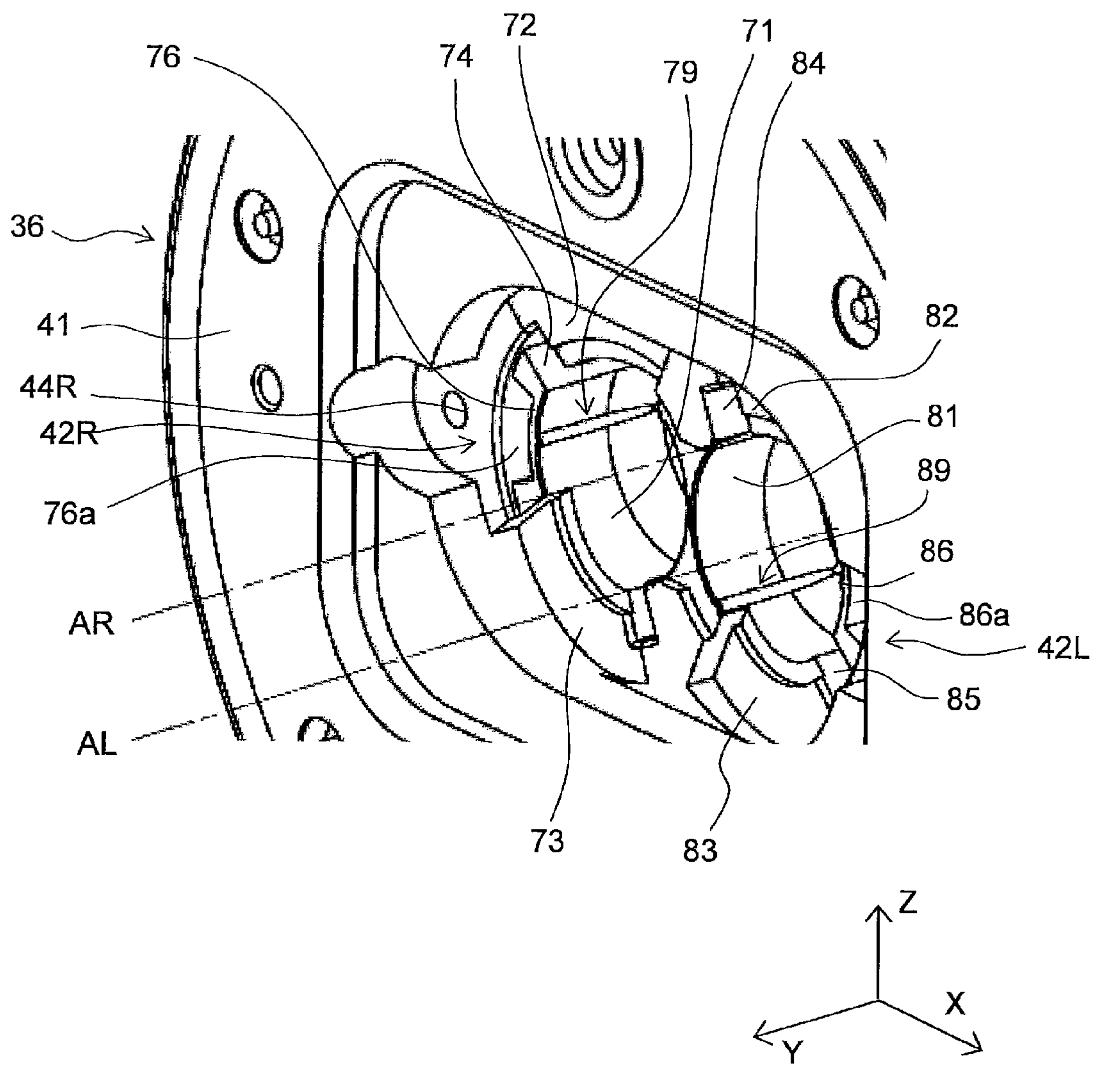
FIG. 5 is an oblique view of a left-side support component and a right-side support component.
Figure 6:
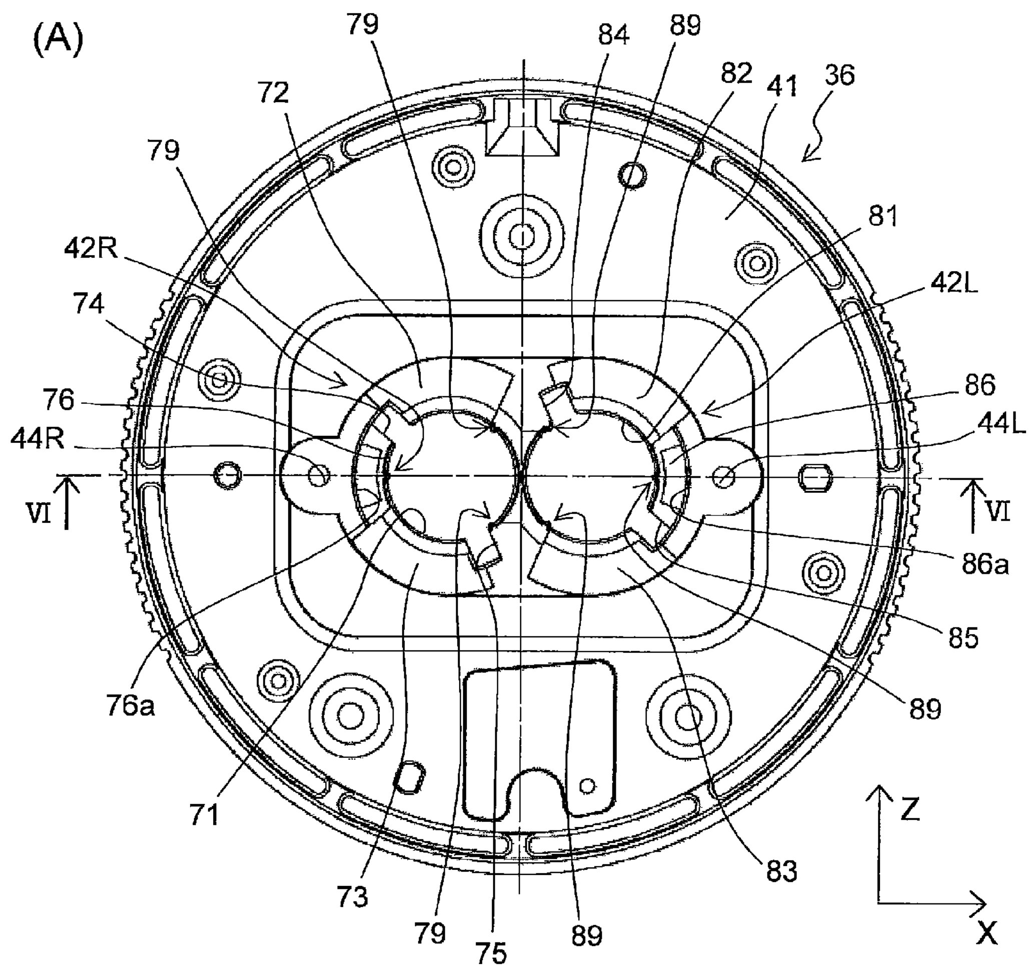
FIG. 6A is a plan view of a lens frame.
FIG. 6B is a VI-VI cross section.
Figure 6:
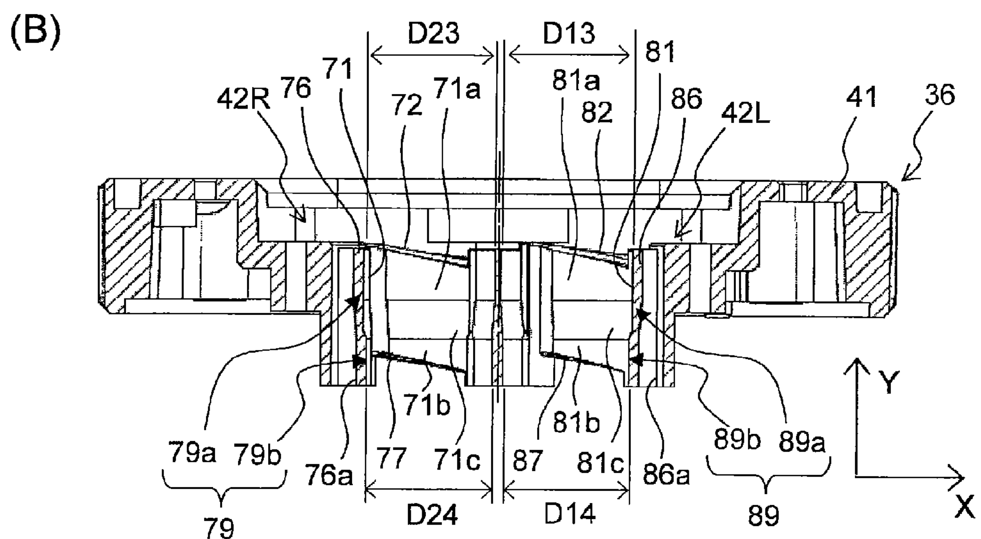
Figure 7:
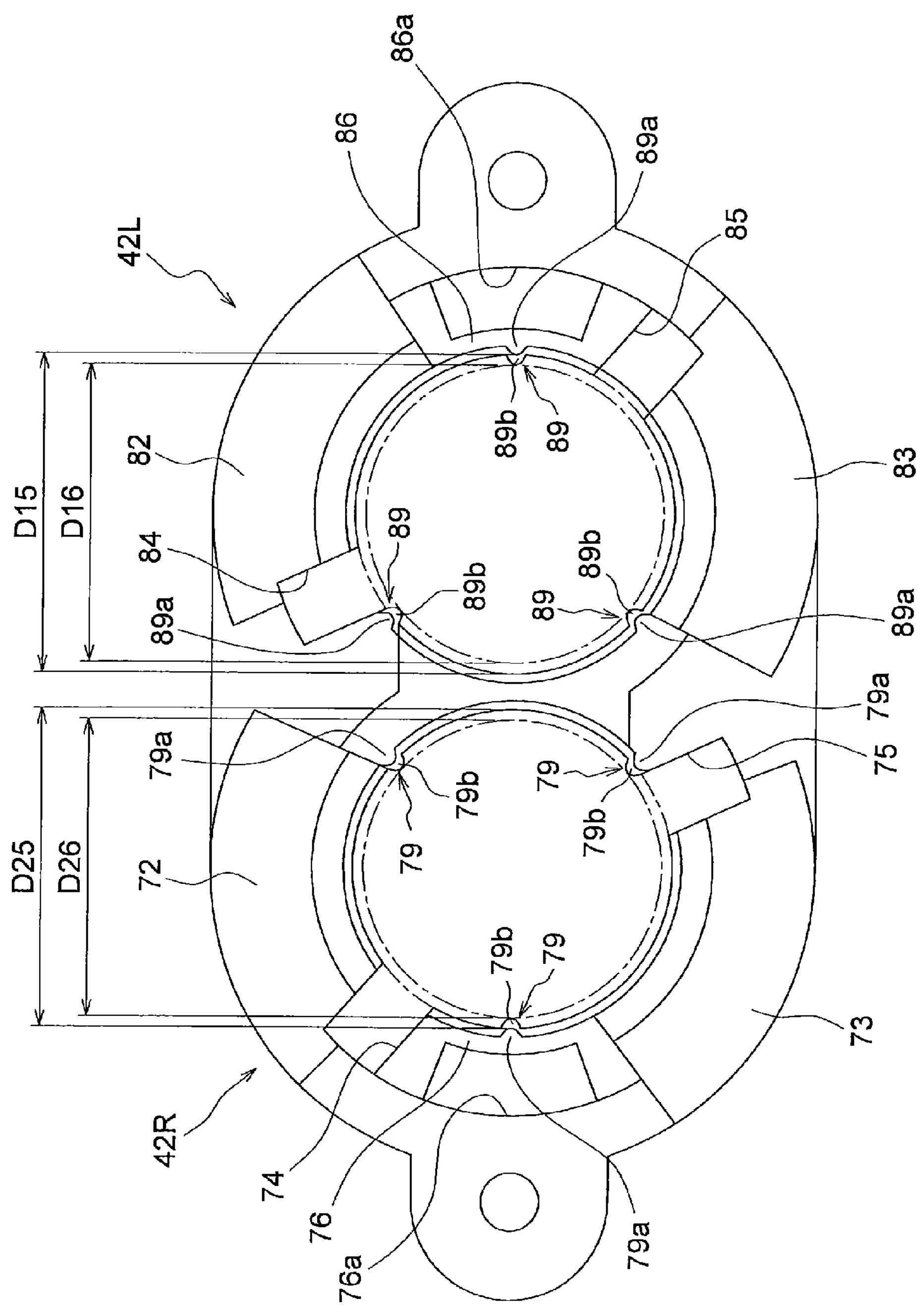
FIG. 7 is a detail plan view of the left- and right-side support components (viewed from the subject side)
Figure 8:
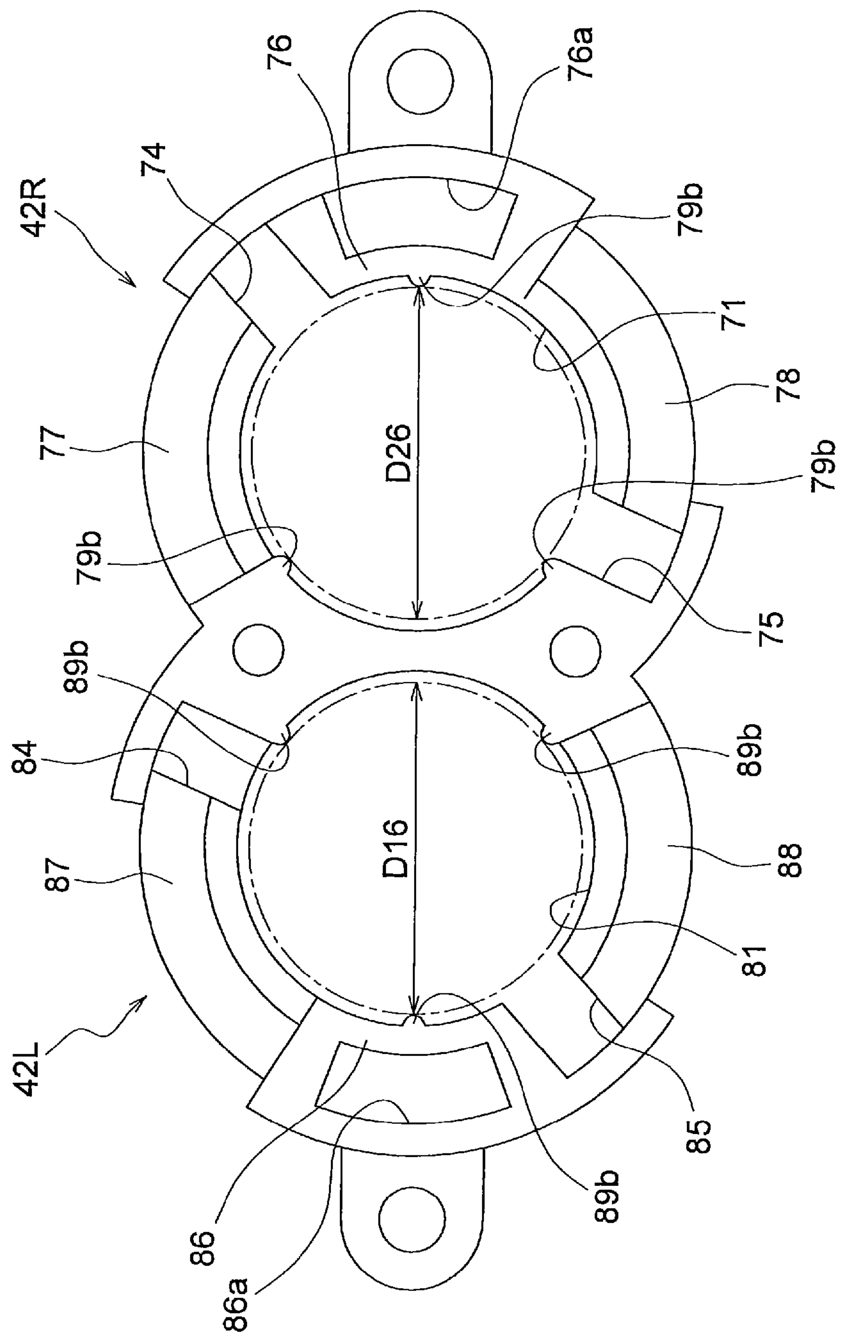
FIG. 8 is a detail plan view of the left- and right-side support components (viewed from the imaging element side)

The configuration of the left-side support component 42L and the right-side support component 42R will now be described through reference to FIGS. 5 to 8. FIG. 5 is an oblique view of the left-side support component 42L and the right-side support component 42R. FIG. 6A is a plan view of the lens frame 35, and FIG. 6B is a VI-VI cross section of FIG. 6A. FIG. 7 is a detail plan view of the left-side support component 42L and the right-side support component 42R viewed from the subject side, and FIG. 8 is a detail plan view of the left-side support component 42L and the right-side support component 42R viewed from the imaging element side. Refer as needed to FIGS. 3A, 3B, and 4 in the following description.

(1-1) Left-Side Support Component 42L

As shown in FIGS. 5 to 8, the left-side support component 42L has front guide faces 82 and 83, and rear guide faces 87 and 88.

The front guide face 82 (one example of a first or second guide face, and one example of a first or second front guide face) is a cam face that guides a front protrusion 62 (discussed below; see FIG. 9) in the peripheral direction and the Y axis direction, and is inclined by a specific angle with respect to the Y axis direction. More specifically, as shown in FIG. 7, the front guide face 82 is formed in an arc shape centering on the left-eye optical axis AL, and as shown in FIG. 6B, it is inclined by a specific angle with respect to the peripheral direction around the left-eye optical axis AL. The front guide face 82 is disposed on the Y axis direction positive side (the subject side) of the left-side support component 42L.

The front guide face 83 (one example of a first or second guide face, and one example of a first or second front guide face) is a cam face that guides a front protrusion 63 (discussed below; see FIG. 9) in the peripheral direction and the Y axis direction, and is inclined by a specific angle with respect to the Y axis direction. More specifically, as shown in FIG. 7, the front guide face 83 is formed in an arc shape centering on the left-eye optical axis AL, and is inclined by a specific angle with respect to the peripheral direction around the left-eye optical axis AL, just as the front guide face 82 is. As shown in FIG. 5, the front guide face 83 is disposed on the Y axis direction positive side (the subject side) of the left-side support component 42L, and is disposed substantially on the opposite side from the front guide face 82 with respect to the left-eye optical axis AL. The inclination angle of the front guide face 82 is set to be the same as the inclination angle of the front guide face 83.

The rear guide face 87 (one example of a first or second guide face, and one example of a first or second rear guide face) is a cam face that guides a rear protrusion 67 (discussed below; see FIG. 9) in the peripheral direction and the Y axis direction, and is inclined by a specific angle with respect to the Y axis direction. More specifically, as shown in FIG. 8, the rear guide face 87 is formed in an arc shape centering on the left-eye optical axis AL, and as shown in FIG. 6B, it is inclined by a specific angle with respect to the peripheral direction around the left-eye optical axis AL. The rear guide face 87 is disposed on the Y axis direction negative side (the imaging element 22 side) of the left-side support component 42L, and is disposed substantially on the opposite side from the front guide face 82 in the Y axis direction.

The rear guide face 88 (one example of a first or second guide face, and one example of a first or second rear guide face) is a cam face that guides a rear protrusion 68 (discussed below; see FIG. 9) in the peripheral direction and the Y axis direction, and is inclined by a specific angle with respect to the Y axis direction. More specifically, as shown in FIG. 8, the rear guide face 88 is formed in an arc shape centering on the left-eye optical axis AL, and is inclined by a specific angle with respect to the peripheral direction around the left-eye optical axis AL, just as is the rear guide face 87. The rear guide face 88 is disposed on the Y axis direction negative side (the imaging element 22 side) of the left-side support component 42L, and is disposed substantially on the opposite side from the rear guide face 87 with respect to the left-eye optical axis AL. Furthermore, the rear guide face 88 is disposed substantially on the opposite side from the front guide face 83 in the Y axis direction. The inclination angle of the rear guide face 87 is set to be the same as the inclination angle of the rear guide face 88.

As shown in FIG. 6A, the left-side support component 42L has a support hole 81, three support protrusions 89, and a presser 86.

A holder main body 61 (see FIG. 9) of the left-eye lens holder 35L is inserted into the support hole 81. In this embodiment, broadly speaking, there are two different inside diameters of the support hole 81. More specifically, as shown in FIG. 6B, the support hole 81 has a first inner peripheral face 81*a*, a second inner peripheral face 81*b*, and a tapered inner peripheral face 81*c*. The first inner peripheral face 81*a* is the inner peripheral face of the support hole 81 on the subject side, and has a first inside diameter D13. The second inner peripheral face 81*b* is the inner peripheral face of the support hole 81 on the imaging element 22 side, and has a second inside diameter D14. The first inside diameter D13 is set to be greater than the second inside diameter D14. The tapered inner peripheral face 81*c* is disposed between the first inner peripheral face 81*a* and the second inner peripheral face 81*b*, and links the first inner peripheral face 81*a* to the second inner peripheral face 81*b*.

The support protrusions 89 (one example of a receiver, and one example of a first or second receiver) protrude inward in the radial direction from the inner peripheral face of the support hole 81, and are formed in a slender shape in the Y axis direction. The three support protrusions 89 are disposed spaced apart in the peripheral direction. The support protrusions 89 (more precisely, the tops of the support protrusions 89) come into slidable contact with the holder main body 61 of the left-eye lens holder 35L.

As shown in FIGS. 6B and 7, each of the support protrusions 89 has a first protrusion 89*a* and a second protrusion 89*b*. The first protrusions 89*a* are formed mainly on the first inner peripheral face 81*a*. The second protrusions 89*b* are formed mainly on the second inner peripheral face 81*b*. The linked portions of the first protrusions 89*a* and the second protrusions 89*b* are disposed on the tapered inner peripheral face 81*c*.

As shown in FIG. 7, in a plan view of the left-side support component 42L, the first inside diameter D15 of a circle that links the tops of the three first protrusions 89*a* is greater than the second inside diameter D16 that links the tops of the three second protrusions 89*b*. Also, in a state in which the left-eye lens holder 35L has not been mounted to the lens frame 36, the first inside diameter D15 is less than the first outside diameter D11 (discussed below; see FIG. 11A), and the second inside diameter D16 is less than the second outside diameter D12 (discussed below; see FIG. 11A).

The presser 86 (one example of a presser, and one example of a second presser) forms part of the inner peripheral face of the support hole 81, and presses the holder main body 61 against the two support protrusions 89 disposed on the right-side support component 42R side. The other support protrusion 89 is disposed on the presser 86. A cavity 86*a* is formed on the outside of the support hole 81. The presser 86 is formed by the cavity 86*a*, and is capable of elastic deformation in the radial direction of the left-eye optical axis AL. In this embodiment, the presser 86 and the cavity 86*a* are disposed between the front guide face 82 and the front guide face 83 in the peripheral direction when viewed in the Y axis direction.

The diameters D15 and D16 of circles linking the tops of the support protrusions 89 are set to be less than the diameters D11 and D12 of the outer peripheral face of the holder main body 61. More specifically, as discussed above, since the first inside diameter D15 is less than the first outside diameter D11 (discussed below), and the second inside diameter D16 is less than the second outside diameter D12 (discussed below), in a state in which the holder main body 61 has been inserted into the support hole 81, the presser 86 bends outward in the radial direction. Therefore, the holder main body 61 is pressed against the two support protrusions 89 by the presser 86, and the holder main body 61 is press-fitted into the left-side support component 42L. That is, there is no gap between the support protrusions 89 and the outer peripheral face of the holder main body 61, and therefore the lens frame 36 can support the left-eye lens holder 35L in a state in which there is no looseness in the radial direction of the left-eye optical axis AL.

The left-side support component 42L has an insertion groove 84 and an insertion groove 85. The insertion groove 84 and the insertion groove 85 are used when the left-eye lens holder 35L is inserted into the left-side support component 42L, and pass through in the Y axis direction. When the left-eye lens holder 35L is mounted to the lens frame 36, the rear protrusion 67 (discussed below) is inserted into the insertion groove 84, and the rear protrusion 68 (discussed below) is inserted into the insertion groove 85.

(1-2) Right-Side Support Component 42R

As shown in FIGS. 5 to 8, the right-side support component 42R has front guide faces 72 and 73 and rear guide faces 77 and 78.

The front guide face 72 (one example of a first or second guide face, and one example of a first or second front guide face) is a cam face that guides a front protrusion 52 (discussed below; see FIG. 9) in the peripheral direction and the Y axis direction, and is inclined by a specific angle with respect to the Y axis direction. More specifically, as shown in FIG. 7, the front guide face 72 is formed in an arc shape centering on the right-eye optical axis AR, and as shown in FIG. 6B, it is inclined by a specific angle with respect to the peripheral direction around the right-eye optical axis AR. The front guide face 72 is disposed on the Y axis direction positive side (the subject side) of the right-side support component 42R.

The front guide face 73 (one example of a first or second guide face, and one example of a first or second front guide face) is a cam face that guides a front protrusion 53 (discussed below; see FIG. 9) in the peripheral direction and the Y axis direction, and is inclined by a specific angle with respect to the Y axis direction. More specifically, as shown in FIG. 7, the front guide face 73 is formed in an arc shape centering on the right-eye optical axis AR, and is inclined by a specific angle with respect to the peripheral direction around the right-eye optical axis AR, just as the front guide face 72 is. As shown in FIG. 5, the front guide face 73 is disposed on the Y axis direction positive side (the subject side) of the right-side support component 42R, and is disposed substantially on the opposite side from the front guide face 72 with respect to the right-eye optical axis AR. The inclination angle of the front guide face 72 is set to be the same as the inclination angle of the front guide face 73.

The rear guide face 77 (one example of a first or second guide face, and one example of a first or second rear guide face) is a cam face that guides a rear protrusion 57 (discussed below; see FIG. 9) in the peripheral direction and the Y axis direction, and is inclined by a specific angle with respect to the Y axis direction. More specifically, as shown in FIG. 8, the rear guide face 77 is formed in an arc shape centering on the right-eye optical axis AR, and as shown in FIG. 6B, it is inclined by a specific angle with respect to the peripheral direction around the right-eye optical axis AR. The rear guide face 77 is disposed on the Y axis direction negative side (the imaging element 22 side) of the right-side support component 42R, and is disposed substantially on the opposite side from the front guide face 72 in the Y axis direction.

The rear guide face 78 (one example of a first or second guide face, and one example of a first or second rear guide face) is a cam face that guides a rear protrusion 58 (discussed below) in the peripheral direction and the Y axis direction, and is inclined by a specific angle with respect to the Y axis direction. More specifically, as shown in FIG. 8, the rear guide face 78 is formed in an arc shape centering on the right-eye optical axis AR, and is inclined by a specific angle with respect to the peripheral direction around the right-eye optical axis AR, just as is the rear guide face 77. The rear guide face 78 is disposed on the Y axis direction negative side (the imaging element 22 side) of the right-side support component 42R, and is disposed substantially on the opposite side from the rear guide face 77 with respect to the right-eye optical axis AR. Furthermore, the rear guide face 78 is disposed substantially on the opposite side from the front guide face 73 in the Y axis direction. The inclination angle of the rear guide face 77 is set to be the same as the inclination angle of the rear guide face 78.

As shown in FIG. 6A, the right-side support component 42R has a support hole 71, three support protrusions 79, and a presser 76.

A holder main body 51 (see FIG. 9) of the right-eye lens holder 35R is inserted into the support hole 71. In this embodiment, broadly speaking, there are two different inside diameters of the support hole 71. More specifically, as shown in FIG. 6B, the support hole 71 has a first inner peripheral face 71*a*, a second inner peripheral face 71*b*, and a tapered inner peripheral face 71*c*. The first inner peripheral face 71*a* is the inner peripheral face of the support hole 71 on the subject side, and has a first inside diameter D23. The second inner peripheral face 71*b* is the inner peripheral face of the support hole 71 on the imaging element 22 side, and has a second inside diameter D24. The first inside diameter D23 is set to be greater than the second inside diameter D24. The tapered inner peripheral face 71*c* is disposed between the first inner peripheral face 71*a* and the second inner peripheral face 71*b*, and links the first inner peripheral face 71*a* to the second inner peripheral face 71*b*.

The support protrusions 79 (one example of a receiver, and one example of a first or second receiver) protrude inward in the radial direction from the inner peripheral face of the support hole 71, and are formed in a slender shape in the Y axis direction. The three support protrusions 79 are disposed spaced apart in the peripheral direction. The support protrusions 79 (more precisely, the tops of the support protrusions 79) come into slidable contact with the holder main body 51 of the right-eye lens holder 35R.

As shown in FIGS. 6B and 7, each of the support protrusions 79 has a first protrusion 79*a* and a second protrusion 79*b*. The first protrusions 79*a* are formed mainly on the first inner peripheral face 71*a*. The second protrusions 79*b* are formed mainly on the second inner peripheral face 71*b*. The linked portions of the first protrusions 79*a* and the second protrusions 79*b* are disposed on the tapered inner peripheral face 71*c*.

As shown in FIG. 7, in a plan view of the right-side support component 42R, the first inside diameter D25 of a circle that links the tops of the three first protrusions 79*a* is greater than the second inside diameter D26 that links the tops of the three second protrusions 79*b*. Also, in a state in which the right-eye lens holder 35R has not been mounted to the lens frame 36, the first inside diameter D25 is less than the first outside diameter D21 (discussed below; see FIG. 11A), and the second inside diameter D26 is less than the second outside diameter D22 (discussed below; see FIG. 11A).

The presser 76 (one example of a presser, and one example of a second presser) forms part of the inner peripheral face of the support hole 71, and presses the holder main body 51 against the two support protrusions 79 disposed on the left-side support component 42L side. The other support protrusion 79 is disposed on the presser 76. A cavity 76*a* is formed on the outside of the support hole 71. The presser 76 is formed by the cavity 76*a*, and is capable of elastic deformation in the radial direction of the right-eye optical axis AR. In this embodiment, the presser 76 and the cavity 76*a* are disposed between the front guide face 72 and the front guide face 73 in the peripheral direction when viewed in the Y axis direction.

The diameters D25 and D26 of circles linking the tops of the support protrusions 79 are set to be less than the diameters D21 and D22 of the outer peripheral face of the holder main body 51. More specifically, as discussed above, since the first inside diameter D25 is less than the first outside diameter D21 (discussed below), and the second inside diameter D26 is less than the second outside diameter D22 (discussed below), in a state in which the holder main body 51 has been inserted into the support hole 71, the presser 76 bends outward in the radial direction. Therefore, the holder main body 51 is pressed against the two support protrusions 79 by the presser 76, and the holder main body 51 is press-fitted into the right-side support component 42R. That is, there is no gap between the support protrusions 79 and the outer peripheral face of the holder main body 51, and therefore the lens frame 36 can support the right-eye lens holder 35R in a state in which there is no looseness in the radial direction of the right-eye optical axis AR.

Also, the right-side support component 42R has an insertion groove 74 and an insertion groove 75. The insertion groove 74 and the insertion groove 75 are used when the right-eye lens holder 35R is inserted into the right-side support component 42R, and pass through in the Y axis direction. When the right-eye lens holder 35R is mounted to the lens frame 36, the rear protrusion 57 (discussed below) is inserted into the insertion groove 74, and the rear protrusion 58 (discussed below) is inserted into the insertion groove 75.

(2) Left-Eye Lens Holder 35L

Figure 9:
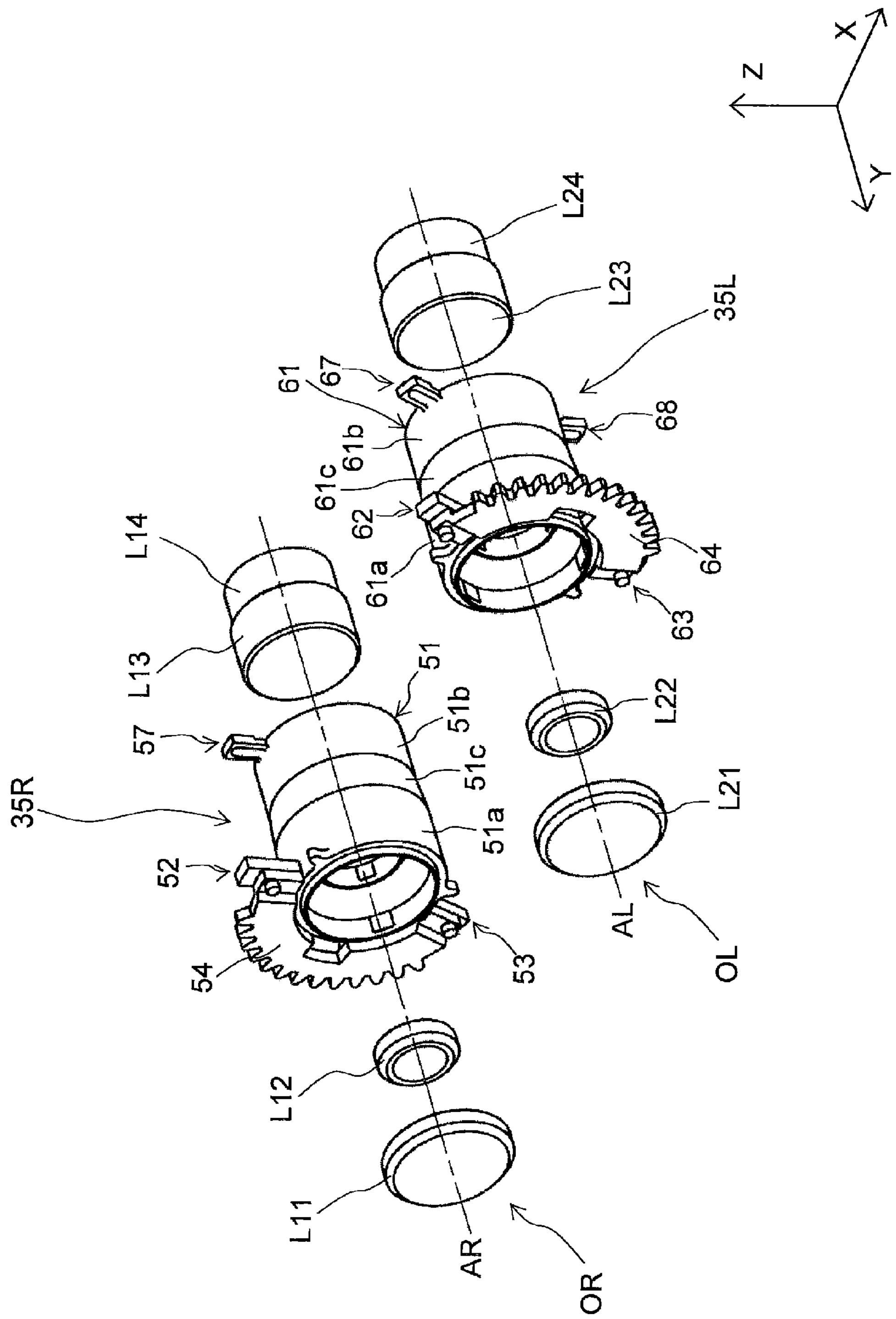
FIG. 9 is an exploded oblique view of a left-eye optical system and a right-eye optical system.

The detailed configuration of the left-eye lens holder 35L will now be described through reference to the drawings. FIG. 9 is an exploded oblique view of the left-eye lens holder 35L and the right-eye lens holder 35R. FIG. 10A is an oblique view of the left-eye lens holder 35L when viewed from the subject side, and FIG. 10B is an oblique view of the left-eye lens holder 35L when viewed from the imaging element side. FIG. 11A is a cross section of the left-eye optical system OL and the left-eye lens holder 35L, and FIG. 11B is a development view of the left-side support component 42L.

The left-eye lens holder 35L is a single member molded integrally from a resin, for example. As shown in FIG. 9, the left-eye lens holder 35L has the holder main body 61, the front protrusions 62 and 63, the rear protrusions 67 and 68, and a gear component 64.

The holder main body 61 (one example of a holder main body, and one example of a first or second holder main body) is a cylindrical portion, to which the left-eye optical system OL is mounted. As shown in FIG. 9, the left-eye optical system OL has a first lens L21, a second lens L22, a third lens L23, and a fourth lens L24.

The holder main body 61 is supported by the left-side support component 42L movably in the Y axis direction and rotatably around the left-eye optical axis AL.

Figure 10:
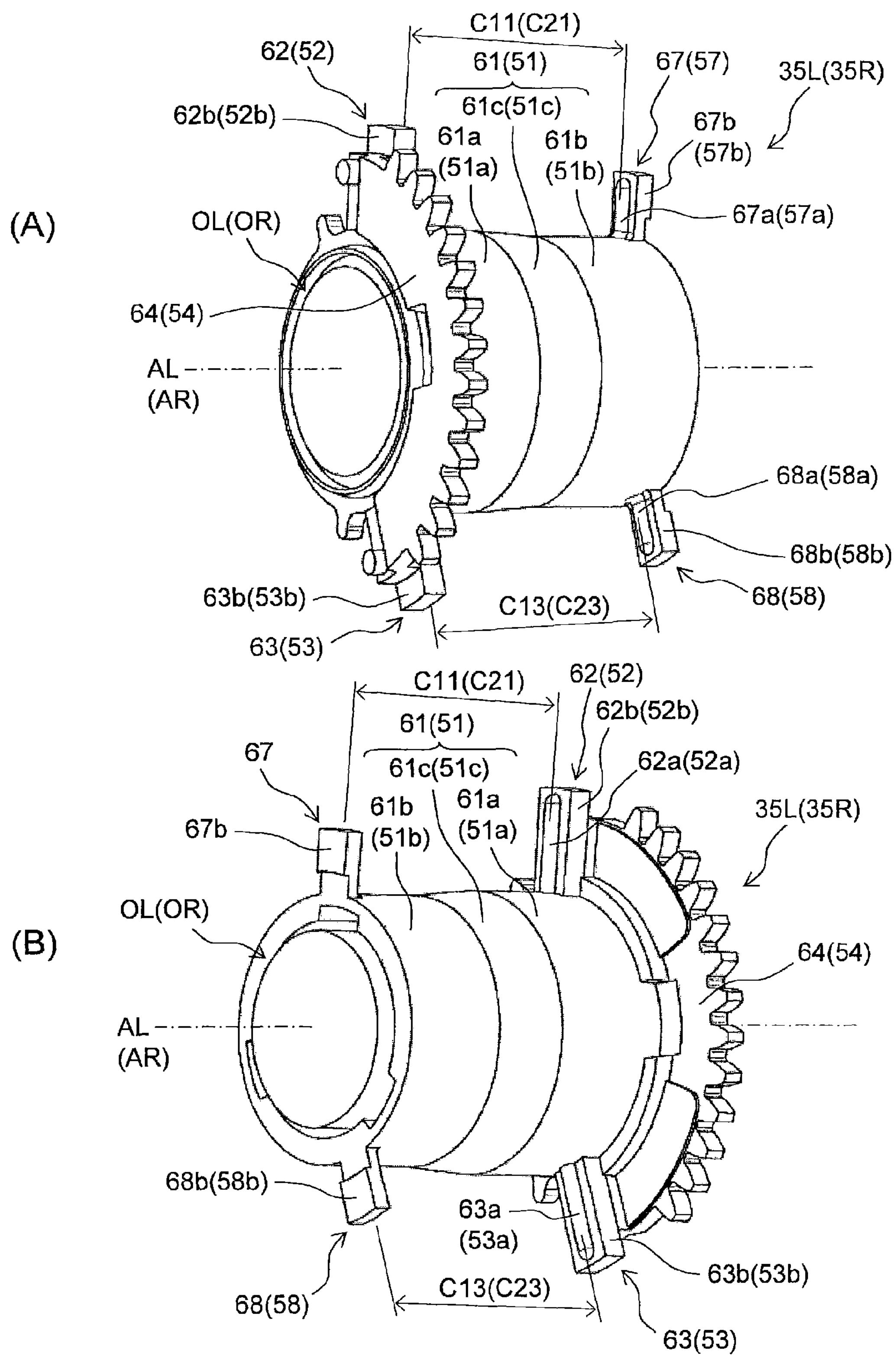
FIG. 10A is an oblique view of a left-eye lens holder.
FIG. 10B is an oblique view of a right-eye lens holder.

In this embodiment, broadly speaking, there are two different outside diameters of the holder main body 61. More specifically, as shown in FIGS. 10 and 11A, the holder main body 61 has a first portion 61*a*, a second portion 61*b*, and a tapered part 61*c*. The first portion 61*a* is a cylindrical portion on the subject side of the holder main body 61, and has the first outside diameter D11 as shown in FIG. 11A. The second portion 61*b* is a cylindrical portion on the imaging element 22 side of the holder main body 61, and has the second outside diameter D12 as shown in FIG. 11A. The first outside diameter D11 is set to be greater than the second outside diameter D12. The tapered part 61*c* is disposed between the first portion 61*a* and the second portion 61*b*, and links the first portion 61*a* and the second portion 61*b*.

The front protrusions 62 and 63 are linked to the holder main body 61, and are guided by the left-side support component 42L as shown in FIG. 11A so as to move in the Y axis direction while rotating around the left-eye optical axis AL.

More specifically, the front protrusion 62 (one example of a first or second portion, and one example of a first or second follower, and one example of a first or second front protrusion) protrudes outward in the radial direction from the end of the holder main body 61 on the subject side (more precisely, from the first portion 61*a*), and comes into contact with the front guide face 82 of the left-side support component 42L as shown in FIG. 11B. The front protrusion 62 has a plate-like protrusion main body 62*b* and a semi-cylindrical slider 62*a* that comes into contact with the front guide face 82.

The front protrusion 63 (one example of a first or second portion, and one example of a first or second follower, and one example of a first or second front protrusion) protrudes outward in the radial direction from the end of the holder main body 61 on the subject side (more precisely, from the first portion 61*a*), and comes into contact with the front guide face 83 of the left-side support component 42L as shown in FIG. 11B. More specifically, the front protrusion 63 has a plate-like protrusion main body 63*b* and a semi-cylindrical slider 63*a* that comes into contact with the front guide face 83.

The rear protrusion 67 (one example of a first or second portion, and one example of a first or second follower, and one example of a first or second front protrusion) protrudes outward in the radial direction from the end of the holder main body 61 on the imaging element 22 side (more precisely, from the second portion 61*b*), and comes into contact with the rear guide face 87 of the left-side support component 42L as shown in FIG. 11B. More specifically, the rear protrusion 67 has a plate-like protrusion main body 67*b* and a semi-cylindrical slider 67*a* that comes into contact with the rear guide face 87. Since the base of the protrusion main body 67*b* is formed thin, the rear protrusion 67 readily bends in the Y axis direction.

The rear protrusion 68 (one example of a first or second portion, and one example of a first or second follower, and one example of a first or second front protrusion) protrudes outward in the radial direction from the end of the holder main body 61 on the imaging element 22 side (more precisely, from the second portion 61*b*), and comes into contact with the rear guide face 88 of the left-side support component 42L as shown in FIG. 11B. More specifically, the rear protrusion 68 has a plate-like protrusion main body 68*b* and a semi-cylindrical slider 68*a* that comes into contact with the rear guide face 88. Since the base of the protrusion main body 68*b* is formed thin, the rear protrusion 68 readily bends in the Y axis direction.

In this embodiment, the front protrusion 62 has the same shape as the front protrusion 63, and the rear protrusion 67 has the same shape as the rear protrusion 68.

Meanwhile, the front protrusion 62 is longer than the rear protrusion 67 in the radial direction, and the front protrusion 63 is longer than the rear protrusion 68 in the radial direction. Furthermore, the dimension of the front protrusion 62 in the peripheral direction is greater than the dimension of the rear protrusion 67 in the peripheral direction, and the dimension of the front protrusion 63 in the peripheral direction is greater than the dimension of the rear protrusion 68 in the peripheral direction.

In a state in which the holder main body 61 has been inserted into the support hole 71, the dimension C11 in the Y axis direction between the slider 62*a* and the slider 67*a* (see FIG. 10A and FIG. 10B) is set to be shorter than the dimension C12 in the Y axis direction between the front guide face 82 and the rear guide face 87 (see FIG. 11B).

Furthermore, in this embodiment, the rear protrusion 67 is thinner than the front protrusion 62 in the Y axis direction. Therefore, there is no gap between the left-side support component 42L and the front protrusion 62, and between the left-side support component 42L and the rear protrusion 67, so the lens frame 36 can support the left-eye lens holder 35L in a state in which there is no looseness in the Y axis direction.

Similarly, with the front protrusion 63 and the rear protrusion 68, in a state in which the holder main body 61 has not been inserted into the support hole 81, the dimension C13 in the Y axis direction between the slider 63*a* and the slider 68*a* (see FIGS. 10A and 10B) is set to be shorter than the dimension C14 in the Y axis direction between the front guide face 82 and the rear guide face 87 (see FIG. 11B). Furthermore, in this embodiment the rear protrusion 68 is thinner in the Y axis direction than the front protrusion 63. Consequently, in a state in which the left-eye lens holder 35L has been mounted to the lens frame 36, the rear protrusion 68 bends, and the left-side support component 42L is sandwiched in the Y axis direction by the front protrusion 63 and the rear protrusion 68 under this reaction force. Therefore, there is no gap between the left-side support component 42L and the front protrusion 63, and between the left-side support component 42L and the rear protrusion 68, and the lens frame 36 can support the left-eye lens holder 35L in a state in which there is no looseness in the Y axis direction.

The gear component 64 (one example of a first rotationally driven component) is linked to the holder main body 61, and is used in adjusting the position of the holder main body 61 in the rotation direction around the left-eye optical axis AL with respect to the base frame 41. More specifically, as shown in FIGS. 9, 10A and 10B, the gear component 64 has a plurality of teeth and is formed in an arc shape around the left-eye optical axis AL. In this embodiment, the gear component 64 links the front protrusions 62 and 63 in the peripheral direction. An adjustment jig 9 (discussed below) can be used to rotate the left-eye lens holder 35L with respect to the lens frame 36 by meshing the gear 91 of the adjustment jig 9 with the gear component 64. This allows the position of the left-eye lens holder 35L in the Y axis direction to be adjusted with respect to the lens frame 36.

(3) Right-Eye Lens Holder 35R

Figure 11:
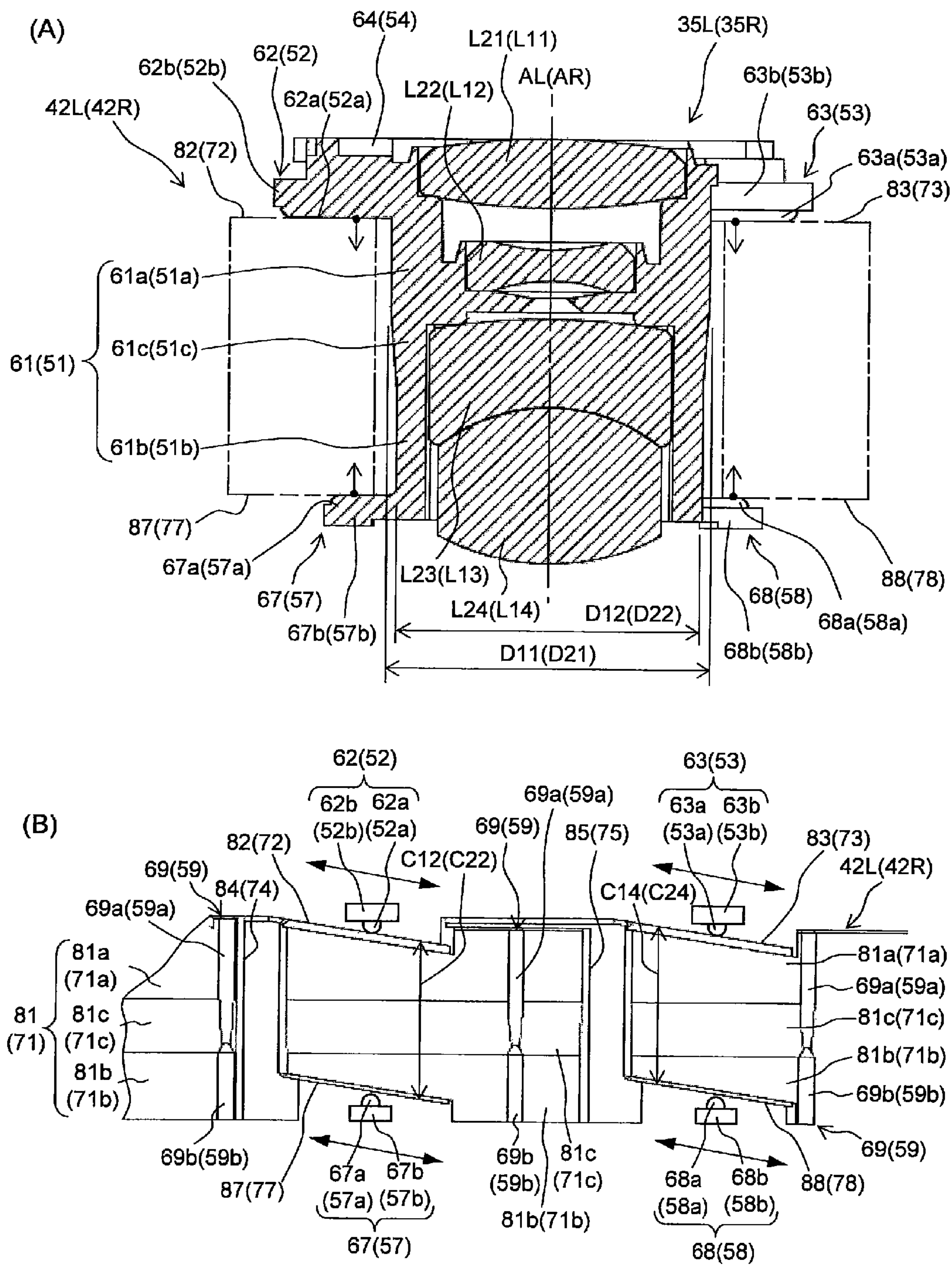
FIG. 11A is a cross section of the left-eye optical system and the left-eye lens holder.
FIG. 11B is a development view of the left-side support component.

The detailed configuration of the right-eye lens holder 35R will now be described through reference to the drawings. In this embodiment, the right-eye lens holder 35R has the same configuration as the left-eye lens holder 35L, so it will be described by again referring to FIGS. 9 to 11. In FIGS. 9 to 11, numbers related to the right-eye lens holder 35R are shown in parentheses.

The right-eye lens holder 35R is a single member molded integrally from a resin, for example. As shown in FIG. 9, the right-eye lens holder 35R has the holder main body 51, the front protrusions 52 and 53, the rear protrusions 57 and 58, and a gear component 54.

The holder main body 51 (one example of a holder main body, and one example of a first or second holder main body) is a cylindrical portion, to which the right-eye optical system OR is mounted. As shown in FIG. 9, the right-eye optical system OR has a first lens L11, a second lens L12, a third lens L13, and a fourth lens L14.

The holder main body 51 is supported by the right-side support component 42R movably in the Y axis direction and rotatably around the right-eye optical axis AR.

In this embodiment, broadly speaking, there are two different outside diameters of the holder main body 51. More specifically, As shown in FIGS. 10 and 11A, the holder main body 51 has a first portion 51*a*, a second portion 51*b*, and a tapered part 51*c*. The first portion 51*a* is a cylindrical portion on the subject side of the holder main body 51, and has the first outside diameter D21 as shown in FIG. 11A. The second portion 51*b* is a cylindrical portion on the imaging element 22 side of the holder main body 51, and has the second outside diameter D22 as shown in FIG. 11A. The first outside diameter D21 is set to be greater than the second outside diameter D22. The tapered part 51*c* is disposed between the first portion 51*a* and the second portion 51*b*, and links the first portion 51*a* and the second portion 51*b*.

The front protrusions 52 and 53 are linked to the holder main body 51, and are guided by the right-side support component 42R as shown in FIG. 11A so as to move in the Y axis direction while rotating around the right-eye optical axis AR.

More specifically, the front protrusion 52 (one example of a first or second portion, and one example of a first or second follower, and one example of a first or second front protrusion) protrudes outward in the radial direction from the end of the holder main body 51 on the subject side (more precisely, from the first portion 51*a*), and comes into contact with the front guide face 72 of the right-side support component 42R as shown in FIG. 11B. The front protrusion 52 has a plate-like protrusion main body 52*b* and a semi-cylindrical slider 52*a* that comes into contact with the front guide face 72.

The front protrusion 53 (one example of a first or second portion, and one example of a first or second follower, and one example of a first or second front protrusion) protrudes outward in the radial direction from the end of the holder main body 51 on the subject side (more precisely, from the first portion 51*a*), and comes into contact with the front guide face 73 of the right-side support component 42R as shown in FIG. 11B. More specifically, the front protrusion 53 has a plate-like protrusion main body 53*b* and a semi-cylindrical slider 53*a* that comes into contact with the front guide face 73.

The rear protrusion 57 (one example of a first or second portion, and one example of a first or second follower, and one example of a first or second front protrusion) protrudes outward in the radial direction from the end of the holder main body 51 on the imaging element 22 side (more precisely, from the second portion 51*b*), and comes into contact with the rear guide face 77 of the right-side support component 42R as shown in FIG. 11B. More specifically, the rear protrusion 57 has a plate-like protrusion main body 57*b* and a semi-cylindrical slider 57*a* that comes into contact with the rear guide face 77. Since the base of the protrusion main body 57*b* is formed thin, the rear protrusion 57 readily bends in the Y axis direction.

The rear protrusion 58 (one example of a first or second portion, and one example of a first or second follower, and one example of a first or second front protrusion) protrudes outward in the radial direction from the end of the holder main body 51 on the imaging element 22 side (more precisely, from the second portion 51*b*), and comes into contact with the rear guide face 78 of the right-side support component 42R as shown in FIG. 11B. More specifically, the rear protrusion 58 has a plate-like protrusion main body 58*b* and a semi-cylindrical slider 58*a* that comes into contact with the rear guide face 78. Since the base of the protrusion main body 58*b* is formed thin, the rear protrusion 58 readily bends in the Y axis direction.

In this embodiment, the front protrusion 52 has the same shape as the front protrusion 53, and the rear protrusion 57 has the same shape as the rear protrusion 58.

Meanwhile, the front protrusion 52 is longer than the rear protrusion 57 in the radial direction, and the front protrusion 53 is longer than the rear protrusion 58 in the radial direction. Furthermore, the dimension of the front protrusion 52 in the peripheral direction is greater than the dimension of the rear protrusion 57 in the peripheral direction, and the dimension of the front protrusion 53 in the peripheral direction is greater than the dimension of the rear protrusion 58 in the peripheral direction.

In a state in which the holder main body 51 has been inserted into the support hole 81, the dimension C21 in the Y axis direction between the slider 52*a* and the slider 57*a* (see FIG. 10A and FIG. 10B) is set to be shorter than the dimension C22 in the Y axis direction between the front guide face 72 and the rear guide face 77 (see FIG. 11B). Furthermore, in this embodiment, the rear protrusion 57 is thinner than the front protrusion 52 in the Y axis direction. Consequently, in a state in which the right-eye lens holder 35R has been mounted to the lens frame 36, the rear protrusion 57 bends, and the right-side support component 42R is sandwiched in the Y axis direction by the front protrusion 52 and the rear protrusion 57 by this reaction force. Therefore, there is no gap between the right-side support component 42R and the front protrusion 52, and between the right-side support component 42R and the rear protrusion 57, so the lens frame 36 can support the right-eye lens holder 35R in a state in which there is no looseness in the Y axis direction.

Similarly, with the front protrusion 53 and the rear protrusion 58, in a state in which the holder main body 51 has not been inserted into the support hole 81, the dimension C23 in the Y axis direction between the slider 53*a* and the slider 58*a* (see FIGS. 10A and 10B) is set to be shorter than the dimension C24 in the Y axis direction between the front guide face 72 and the rear guide face 77 (see FIG. 11B). Furthermore, in this embodiment the rear protrusion 58 is thinner in the Y axis direction than the front protrusion 53. Consequently, in a state in which the right-eye lens holder 35R has been mounted to the lens frame 36, the rear protrusion 58 bends, and the right-side support component 42R is sandwiched in the Y axis direction by the front protrusion 53 and the rear protrusion 58 under this reaction force. Therefore, there is no gap between the right-side support component 42R and the front protrusion 53, and between the right-side support component 42R and the rear protrusion 58, and the lens frame 36 can support the right-eye lens holder 35R in a state in which there is no looseness in the Y axis direction.

The gear component 54 (one example of a second rotationally driven component) is linked to the holder main body 51, and is used in adjusting the position of the holder main body 51 in the rotation direction around the right-eye optical axis AR with respect to the base frame 41. More specifically, as shown in FIGS. 9, 10A and 10B, the gear component 54 has a plurality of teeth and is formed in an arc shape around the right-eye optical axis AR. In this embodiment, the gear component 54 links the front protrusions 52 and 53 in the peripheral direction. An adjustment jig 9 (discussed below) can be used to rotate the right-eye lens holder 35R with respect to the lens frame 36 by meshing the gear 91 of the adjustment jig 9 with the gear component 54. This allows the position of the right-eye lens holder 35R in the Y axis direction to be adjusted with respect to the lens frame 36.

3. Assembly and Adjustment

Figure 12:
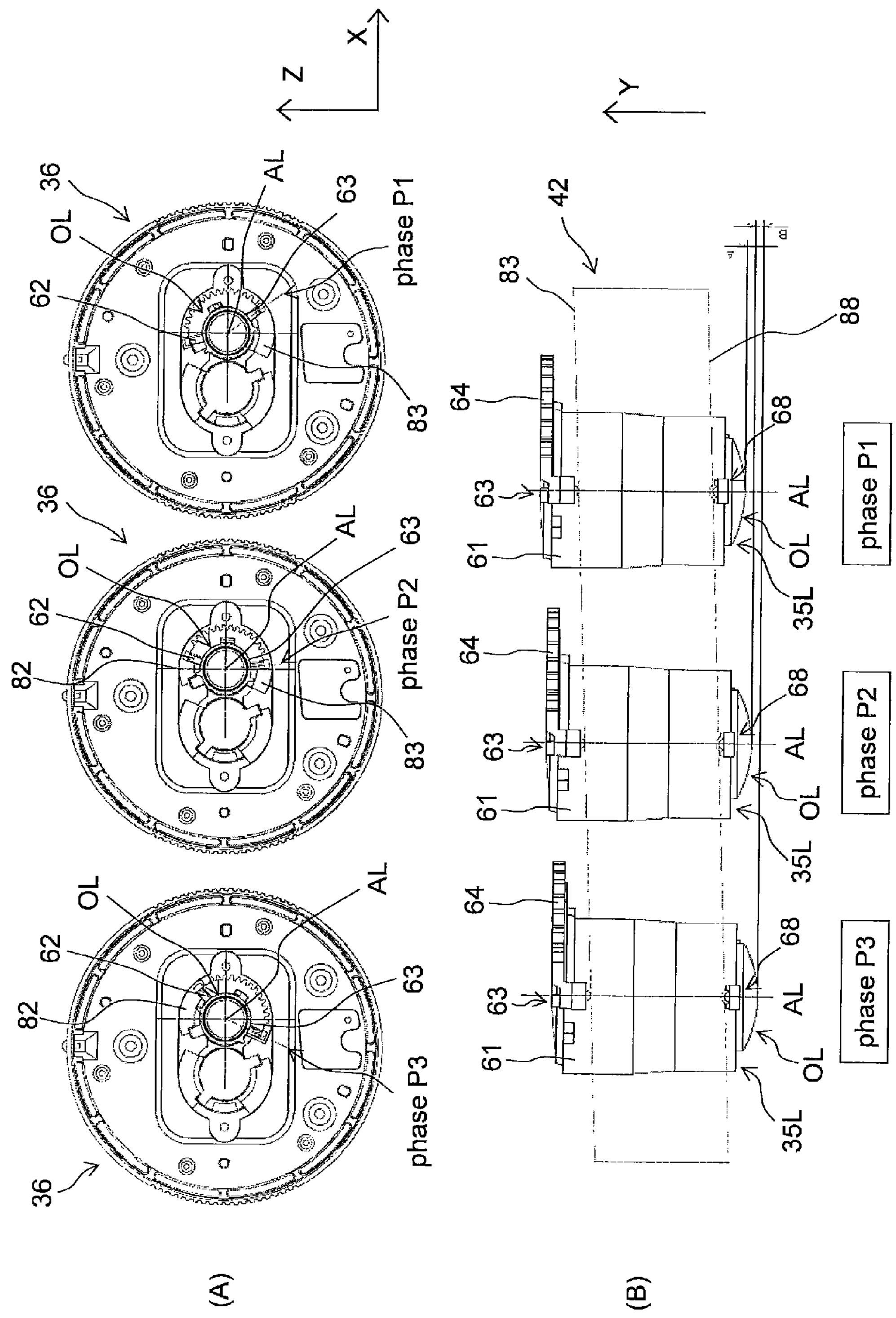
FIG. 12A is a diagram illustrating the rotation of the left-eye lens holder.
FIG. 12B is a diagram illustrating the operation of the left-eye lens holder.
Figure 13:
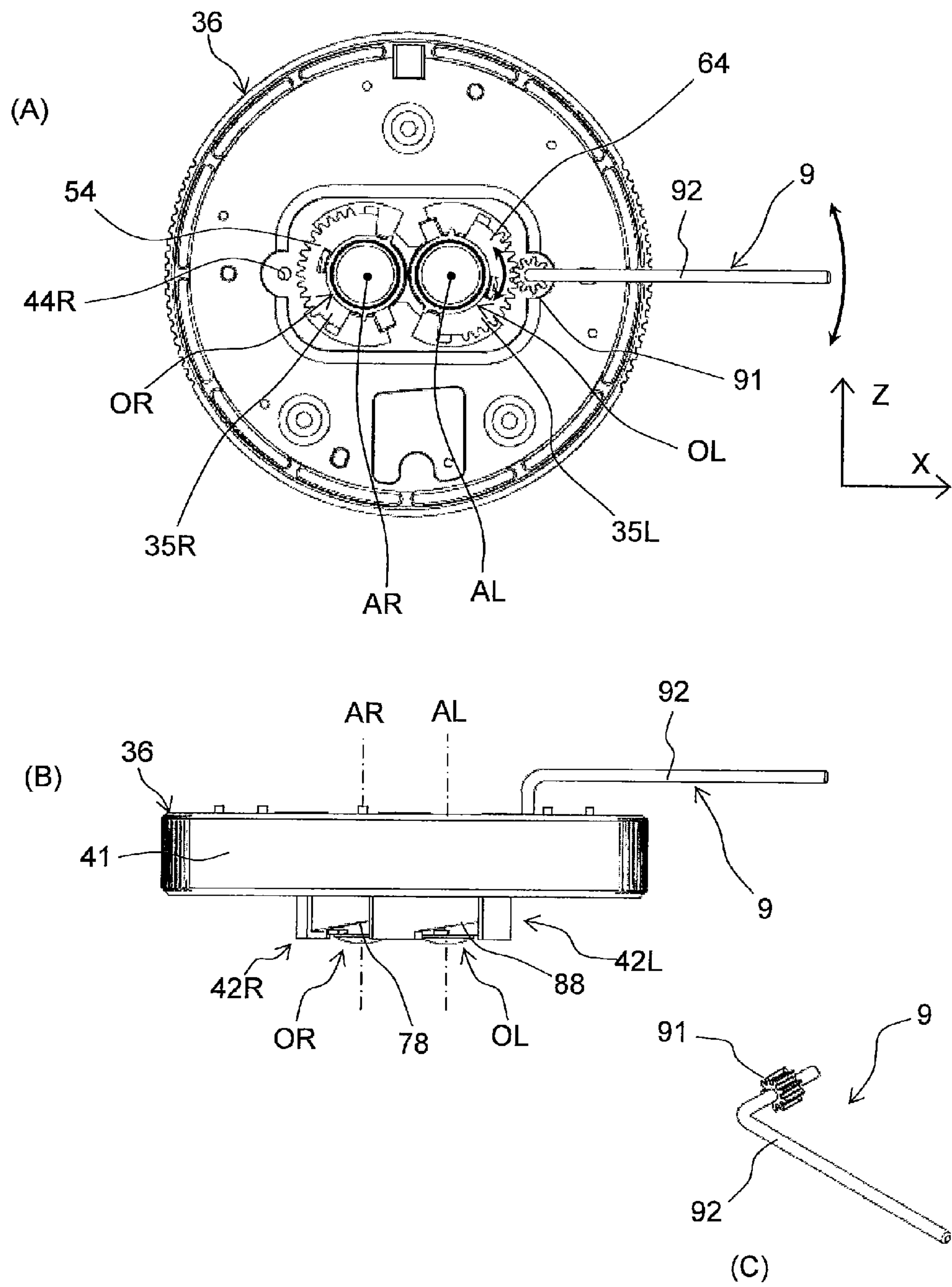
FIG. 13A is a diagram illustrating adjustment work.
FIG. 13B is a diagram illustrating adjustment work.
FIG. 13C is an oblique view of an optical axis adjustment jig.

The job of assembling the lens frame 36, the left-eye lens holder 35L, and the right-eye lens holder 35R, and the job of adjusting the positions of the left-eye optical system OL and the right-eye optical system OR in the Y axis direction will now be described through reference to the drawings. FIG. 12A is a diagram illustrating the rotation of the left-eye lens holder 35L, and FIG. 12B is a diagram illustrating the operation of the left-eye lens holder 35L. FIGS. 13A and 13B are diagrams illustrating adjustment work, and FIG. 13C is an oblique view of an optical axis adjustment jig.

First, the left-eye optical system OL is adhesively fixed to the left-eye lens holder 35L, and the right-eye optical system OR is adhesively fixed to the right-eye lens holder 35R (see FIG. 9).

In the mounting of the left-eye lens holder 35L to the lens frame 36, the left-eye lens holder 35L is mounted to the lens frame 36 from the subject side (see FIG. 4). More specifically, the rear protrusion 67 is inserted into the insertion groove 84, the rear protrusion 68 is inserted into the insertion groove 85, and the holder main body 61 is inserted into the support hole 81. Since the second outside diameter D12 of the second portion 61*b* is greater than the second inside diameter D16 defined by the three second protrusions 89*b*, when the second portion 61*b* is inserted into the second inner peripheral face 81*b*, the presser 86 is pushed outward in the radial direction by the second portion 61*b*, and the second portion 61*b* is pressed against the two second protrusions 89*b* by the elastic force of the presser 86.

Also, since the first outside diameter D11 of the first portion 61*a* is greater than the first inside diameter D15 defined by the three first protrusions 89*a*, when the first portion 61*a* is inserted into the first inner peripheral face 81*a*, the presser 86 is pushed outward in the radial direction by the first portion 61*a*, and the first portion 61*a* is pressed against the two first protrusions 89*a* by the elastic force of the presser 86.

This results in a state in which the holder main body 61 is lightly press-fitted into the left-side support component 42L by the elastic force of the presser 86.

Since the front protrusion 62 is longer than the rear protrusion 67, the front protrusion 62 cannot be inserted into the insertion groove 84. Therefore, when the holder main body 61 is inserted into the support hole 81, the front protrusion 62 comes into contact with the area around the insertion groove 84, and this decides the position of the left-eye lens holder 35L in the Y axis direction with respect to the left-side support component 42L. Consequently, in mounting the left-eye lens holder 35L to the left-side support component 42L, the assembly work can be carried out smoothly, without inserting the holder main body 61 too far into the support hole 81.

Then, in the mounting of the right-eye lens holder 35R to the lens frame 36, the right-eye lens holder 35R is mounted to the lens frame 36 from the subject side (see FIG. 4). More specifically, the rear protrusion 57 is inserted into the insertion groove 74, the rear protrusion 58 is inserted into the insertion groove 75, and the holder main body 51 is inserted into the support hole 71. Since the second outside diameter D22 of the second portion 51*b* is greater than the second inside diameter D24 defined by the three second protrusions 79*b*, when the second portion 51*b* is inserted into the second inner peripheral face 71*b*, the presser 76 is pushed outward in the radial direction by the second portion 51*b*, and the second portion 51*b* is pressed against the two second protrusions 79*b* by the elastic force of the presser 76.

Also, since the first outside diameter D21 of the first portion 51*a* is greater than the first inside diameter D23 defined by the three first protrusions 79*a*, when the first portion 51*a* is inserted into the first inner peripheral face 71*a*, the presser 76 is pushed outward in the radial direction by the first portion

51*a*, and the first portion 51*a* is pressed against the two first protrusions 79*a* by the elastic force of the presser 76.

This results in a state in which the holder main body 51 is lightly press-fitted into the right-side support component 42R by the elastic force of the presser 76.

Since the front protrusion 52 is longer than the rear protrusion 57, the front protrusion 52 cannot be inserted into the insertion groove 74. Therefore, when the holder main body 51 is inserted into the support hole 71, the front protrusion 52 comes into contact with the area around the insertion groove 74, and this decides the position of the right-eye lens holder 35R in the Y axis direction with respect to the right-side support component 42R. Consequently, in mounting the right-eye lens holder 35R to the right-side support component 42R, the assembly work can be carried out smoothly, without inserting the holder main body 51 too far into the support hole 71.

Next, after the left-eye lens holder 35L and the right-eye lens holder 35R have been mounted to the lens frame 36, the lens frame 36 is fixed to a stand (not shown) comprising an adjustment-use imaging element (not shown). For example, in a state prior to adjustment, the position (also called the phase) of the left-eye lens holder 35L in the rotational direction with respect to the lens frame 36 corresponds to the phase P1 shown in FIGS. 12A and 12B.

An adjustment chart (not shown) is then put at a specific distance on the front side of the lens frame 36 (the opposite side from the imaging element), and the chart is shown on an adjustment display (not shown) via the imaging element. Also, a waveform representing the contrast evaluation value of the image acquired by the imaging element is displayed on another display (not shown). The user looks at the image and waveform shown in these displays while adjusting the positions of the left-eye lens holder 35L and the right-eye lens holder 35R.

More specifically, as shown in FIGS. 13A and 13B, the distal end of the adjustment jig 9 is inserted into a hole 44L in the lens frame 36 (see FIG. 6) while the gear 91 of the adjustment jig 9 is meshed with the gear component 64 of the left-eye lens holder 35L. When the adjustment jig 9 is rotated counter-clockwise, the left-eye lens holder 35L rotates clockwise with respect to the lens frame 36, and the position of the left-eye lens holder 35L in the rotational direction with respect to the lens frame 36 changes to a phase P2 or a phase P3.

When the left-eye lens holder 35L rotates clockwise with respect to the 36, the front protrusions 62 and 63 rotate around the left-eye optical axis AL while being guided to the imaging element side by the front guide faces 82 and 83, respectively, and the rear protrusions 67 and 68 rotate around the left-eye optical axis AL while being guided to the imaging element side by the rear guide faces 87 and 88, respectively. As a result, the left-eye lens holder 35L rotates while moving gradually to the imaging element side with respect to the lens frame 36.

Here, a waveform representing the contrast evaluation value of the image acquired by the imaging element is disposed on another display (not shown). The user looks at this waveform while turning the adjustment jig 9 to determine the position of the left-eye lens holder 35L at which the evaluation value is highest. For instance, this evaluation value is calculated by the same method for calculating an evaluation value used in auto-focusing by contrast detection method.

Then, for the right-eye lens holder 35R, the adjustment jig 9 is similarly inserted into a hole 44R (see FIG. 6) to adjust the position of the right-eye lens holder 35R. When the adjustment jig 9 is rotated counter-clockwise, the right-eye lens holder 35R rotates clockwise with respect to the lens frame 36. When the right-eye lens holder 35R rotates clockwise with respect to the lens frame 36, the right-eye lens holder 35R rotates while gradually moving to the imaging element side with respect to the lens frame 36. The user looks at the waveform displayed on the display while turning the adjustment jig 9 to determine the position of the right-eye lens holder 35R at which the evaluation value is highest.

After this, the left-eye lens holder 35L and the right-eye lens holder 35R are adhesively fixed to the lens frame 36. For instance, the front protrusion 62 and the front protrusion 63 are bonded to the lens frame 36, and the front protrusion 52 and the front protrusion 53 are bonded to the lens frame 36.

This allows the positions of the left-eye optical system OL and the right-eye optical system OR with respect to the lens frame 36 to be accurately adjusted in the Y axis direction.

In the adjustment work constituted as above, the amount of movement of the left-eye lens holder 35L and the right-eye lens holder 35R in the Y axis direction with respect to the rotational angle of the adjustment jig 9 can be reduced by increasing the reduction ratio between the gear component 64 and the gear 91 of the adjustment jig 9, and the reduction ratio between the gear component 54 and the gear 91, which is an easy way to improve the accuracy in adjusting the positions of the left-eye optical system OL and the right-eye optical system OR in the Y axis direction. Also, by increasing the length of a lever 92 of the adjustment jig 9, the user can make fine adjustments with large movements of the adjustment jig 9, affording greater adjustment precision and making the work easier.

Features of Interchangeable Lens Unit

The features of the interchangeable lens unit 3 described above are compiled below.

(1) With this interchangeable lens unit 3, the position of the left-eye optical system OL in the Y axis direction with respect to the base frame 41, and the position of the right-eye optical system OR in the Y axis direction with respect to the base frame 41 can be separately adjusted by the adjustment mechanism 49. Therefore, even if the positions of the left-eye optical system OL and the right-eye optical system OR with respect to the base frame 41 should deviate from the designed positions due to individual differences between products, the relative positions of the left-eye optical system OL and the right-eye optical system OR can still be adjusted. This means that there will be less of a decrease in the quality of a stereo image attributable to individual differences between products.

Also, since the positions of the left-eye optical system OL and the right-eye optical system OR in the Y axis direction with respect to the 22 can be adjusted separately, the focal positions of the left-eye optical system OL and the right-eye optical system OR with respect to the imaging element 22 can each be adjusted precisely. Therefore, a stereo image of higher quality can be obtained with this interchangeable lens unit 3.

(2) With this interchangeable lens unit 3, since the left-eye lens holder 35L is supported by the left-side support component 42L so as to move in the Y axis direction while rotating with respect to the base frame 41, the position of the left-eye optical system OL in the Y axis direction with respect to the base frame 41 can be adjusted by rotating the left-eye lens holder 35L.

More specifically, the interchangeable lens unit 3 has the front guide faces 82 and 83 and the rear guide faces 87 and 88 that function as cam faces, and has the front protrusions 62 and 63 and the rear protrusions 67 and 68 that function as cam followers. Since the front guide faces 82 and 83 and the rear guide faces 87 and 88 are inclined with respect to the left-eye optical axis AL, when the left-eye lens holder 35L rotates with respect to the left-side support component 42L, the front protrusion 62 rotates around the left-eye optical axis AL while being guided in the Y axis direction by the front guide face 82, and the rear protrusion 67 rotates around the left-eye optical axis AL while being guided in the Y axis direction by the rear guide face 87. Also, when the right-eye lens holder 35R rotates with respect to the right-side support component 42R, the front protrusion 63 rotates around the left-eye optical axis AL while being guided in the Y axis direction by the front guide face 83, and the rear protrusion 68 rotates around the left-eye optical axis AL while being guided in the Y axis direction by the rear guide face 88.

Similarly, since the right-eye lens holder 35R is supported by the right-side support component 42R so as to move in the Y axis direction while rotating with respect to the base frame 41, the position of the right-eye optical system OR in the Y axis direction with respect to the base frame 41 can be adjusted by rotating the right-eye lens holder 35R.

More specifically, the interchangeable lens unit 3 has the front guide faces 72 and 73 and the rear guide faces 77 and 78 that function as cam faces, and has the front protrusions 52 and 53 and the rear protrusions 57 and 58 that function as cam followers. Since the front guide faces 72 and 73 and the rear guide faces 87 and 78 are inclined with respect to the right-eye optical axis AR, when the right-eye lens holder 35R rotates with respect to the right-side support component 42R, the front protrusion 52 rotates around the right-eye optical axis AR while being guided in the Y axis direction by the front guide face 72, and the rear protrusion 57 rotates around the right-eye optical axis AR while being guided in the Y axis direction by the rear guide face 77. Also, when the right-eye lens holder 35R rotates with respect to the right-side support component 42R, the front protrusion 53 rotates around the right-eye optical axis AR while being guided in the Y axis direction by the front guide face 73, and the rear protrusion 58 rotates around the right-eye optical axis AR while being guided in the Y axis direction by the rear guide face 78.

Thus, with the interchangeable lens unit 3, a cam mechanism can be used to adjust the positions of the left-eye optical system OL and the right-eye optical system OR in the Y axis direction, so the structure can be simplified.

(3) With this interchangeable lens unit 3, the left-side support component 42L is sandwiched in the Y axis direction by the front protrusion 62 and the rear protrusion 67, and the left-side support component 42L is sandwiched in the Y axis direction by the front protrusion 63 and the rear protrusion 68. Therefore, there is less looseness of the left-eye lens holder 35L in the Y axis direction with respect to the left-side support component 42L, and the accuracy of adjustment of the position of the left-eye optical system OL with respect to the lens frame 36 can be increased.

Similarly, the right-side support component 42R is sandwiched in the Y axis direction by the front protrusion 52 and the rear protrusion 57, and the right-side support component 42R is sandwiched in the Y axis direction by the front protrusion 53 and the rear protrusion 58. Therefore, there is less looseness of the right-eye lens holder 35R in the Y axis direction with respect to the right-side support component 42R, and the accuracy of adjustment of the position of the right-eye optical system OR with respect to the lens frame 36 can be increased.

(4) With this interchangeable lens unit 3, since the holder main body 61 is pressed against the two support protrusions 89 by the presser 86, there is less looseness in the left-eye lens holder 35L in the radial direction with respect to the lens frame 36, and the position of the left-eye optical system OL with respect to the lens frame 36 can be adjusted more accurately.

Also, compared to a structure not provided with the presser 86, looseness in the left-eye lens holder 35L with respect to the left-side support component 42L can be reduced without greatly increasing the force at which the holder main body 61 is pressed in the radial direction. Therefore, compared to a structure not provided with the presser 86, the left-eye lens holder 35L can be turned more smoothly with respect to the lens frame 36 during adjustment, and this makes it easier to adjust the position of the left-eye lens holder 35L.

Furthermore, any dimensional error in a product can be absorbed by the elastic deformation of the presser 86, so the force supporting the left-eye lens holder 35L can be kept substantially constant despite the dimensional error. Therefore, the effect that dimensional error has on adjustment of the position of the left-eye lens holder 35L can be reduced.

Similarly, since the holder main body 51 is pressed against the two support protrusions 79 by the presser 76, there is less looseness in the right-eye lens holder 35R in the radial direction with respect to the lens frame 36, and the position of the right-eye optical system OR with respect to the lens frame 36 can be adjusted more accurately.

Also, compared to a structure not provided with the presser 76, looseness in the right-eye lens holder 35R with respect to the right-side support component 42R can be reduced without greatly increasing the force at which the holder main body 61 is pressed in the radial direction. Therefore, compared to a structure not provided with the presser 76, the right-eye lens holder 35R can be turned more smoothly with respect to the lens frame 36 during adjustment, and this makes it easier to adjust the position of the right-eye lens holder 35R.

Furthermore, any dimensional error in a product can be absorbed by the elastic deformation of the presser 76, so the force supporting the right-eye lens holder 35R can be kept substantially constant despite the dimensional error. Therefore, the effect that dimensional error has on adjustment of the position of the right-eye lens holder 35R can be reduced.

(5) Since the left-eye lens holder 35L has the gear component 64, the amount of movement of the left-eye lens holder 35L in the Y axis direction with respect to the rotational angle of the adjustment jig 9 can be reduced by increasing the reduction ratio between the gear component 64 and the gear 91 of the adjustment jig 9, which means that adjustment precision can be easily increased.

Similarly, since the right-eye lens holder 35R has the gear component 54, the amount of movement of the right-eye lens holder 35R in the Y axis direction with respect to the rotational angle of the adjustment jig 9 can be reduced by increasing the reduction ratio between the gear component 54 and the gear 91 of the adjustment jig 9, which means that adjustment precision can be easily increased.

Other Embodiments

The present invention is not limited to or by the above embodiment, and various changes and modifications are possible without departing from the gist of the invention.

(A) In the above embodiment, a lens unit was described by using the interchangeable lens unit 3 that was compatible with three-dimensional imaging, but the configuration of the lens unit is not limited to that in the above embodiment. For example, a structure for turning the lens holder to adjust the position in the Y axis direction of the optical system can also be applied to a lens unit that is compatible with two-dimensional imaging.

In this case, the configuration can be simplified while increasing the accuracy of adjustment of positions in the optical system.

Also, in the above embodiment, an interchangeable lens type of imaging device was used as an example in describing a lens unit, but the lens unit can also be applied to an integrated type of imaging device.

Examples of imaging devices include devices capable of capturing only still pictures, devices capable of capturing only moving pictures, and devices capable of capturing both still pictures and moving pictures.

(B) In the above embodiment, the positions of the left-eye optical system OL and the right-eye optical system OR in the Y axis direction were adjusted separately, but only the position of the left-eye optical system OL or of the right-eye optical system OR may be adjusted in the Y axis direction. Even if only the position of the left-eye optical system OL or of the right-eye optical system OR can be adjusted in the Y axis direction, it is still possible to minimize the decrease in stereo image quality attributable to individual differences between products.

(C) In the above embodiment, a cam mechanism was used as an example in separately describing the positions of the left-eye optical system OL and the right-eye optical system OR in the Y axis direction. However, if the only object is to minimize the decrease in stereo image quality attributable to individual differences between products, then a mechanism other than a cam mechanism may be employed as the configuration for separately describing the positions of the left-eye optical system OL and the right-eye optical system OR in the Y axis direction.

Also, in the above embodiment, an adjustment mechanism was described by using a cam mechanism comprising a cam face and a cam follower as an example, but a cam mechanism comprising a cam groove and a cam follower may be used instead.

(D) In the above embodiment, the lens frame 36 was constituted by a single, integrally molded member, but one or more of the base frame 41, the left-side support component 42L, and the right-side support component 42R may be constituted by separate members rather than being integrated.

Also, the left-eye lens holder 35L was constituted by a single, integrally molded member, but one or more of the holder main body 61, the front protrusions 62 and 63, the gear component 64, and the rear protrusions 67 and 68 may be constituted by separate members.

Furthermore, the right-eye lens holder 35R was constituted by a single, integrally molded member, but one or more of the holder main body 51, the front protrusions 52 and 53, the gear component 54, and the rear protrusions 57 and 58 may be constituted by separate members.

(E) In the above embodiment, the left-side support component 42L was sandwiched in the Y axis direction by the front protrusion 62 and the rear protrusion 67, but for the purpose of minimizing the decrease in stereo image quality attributable to individual differences between products, the left-side support component 42L need not be sandwiched in the Y axis direction by the front protrusion 62 and the rear protrusion 67. For example, a gap may be formed between the front protrusion 62 and the front guide face 72 (or between the rear protrusion 67 and the rear protrusion 77) to the extent that it does not affect the quality of the stereo image.

The same applies to the front protrusion 63 and the rear protrusion 68, to the front protrusion 52 and the rear protrusion 57, and to the front protrusion 53 and the rear protrusion 58.

(F) In the above embodiment, the holder main body 61 was pressed against the two support protrusions 89 by the presser 86 of the left-side support component 42L, but the left-side support component 42L need not have the presser 86.

Similarly, the holder main body 51 was pressed against the two support protrusions 79 by the presser 76 of the right-side support component 42R, but the right-side support component 42R need not have the presser 76.

Addenda

The features of the lens unit described above can also be expressed as follows.

Feature 1

A lens unit comprising:

an optical system having an optical axis;

a lens holder to which the optical system is mounted; and a lens frame that supports the lens holder movably in a first direction parallel to the optical axis and rotatably around the optical axis, wherein the lens frame has a base frame, and a guide component that is linked to the base frame and supports the lens holder so as to move in the first direction while rotating with respect to the base frame, the lens holder has a first portion that is disposed so as to be capable of sliding over the guide component, and a second portion that is disposed so as to be capable of sliding over the guide component and is disposed spaced apart from the first portion in the first direction, and the guide component is sandwiched between the first portion and the second portion by the elastic force of the first portion and/or the second portion.

Feature 2

The lens unit according to Feature 1, wherein the lens holder has a holder main body to which the optical system is mounted and which is supported movably in the first direction and rotatably around the first optical axis by the lens frame, the first portion protrudes from the holder main body, and the second portion protrudes from the holder main body.

Feature 3

The lens unit according to Feature 2, wherein the guide component has a first guide face that is inclined with respect to the optical axis, and a second guide face that is disposed on the opposite side from the first guide face in the first direction and is inclined with respect to the optical axis, the first portion is in slidable contact with the first guide face, and the second portion is in slidable contact with the second guide face.

Feature 4

The lens unit according to Feature 2 or 3, wherein the support component has a receiver that comes into contact with the outer peripheral face of the holder main body, and a presser that presses the holder main body against the receiver.

Feature 5

A lens unit comprising:

a first optical system for forming a first optical image viewed from a first viewpoint;

a second optical system for forming a second optical image viewed from a second viewpoint that is different from the first viewpoint; and an adjustment mechanism for adjusting the position of the first optical system in a first direction that is parallel to the first optical axis with respect to the base frame, and/or the position of the second optical system in a second direction that is parallel to the second optical system with respect to the base frame.

Feature 6

The lens unit according to Feature 5, wherein the adjustment mechanism is capable of separately adjusting the position of the first optical system in the first direction with respect to the base frame, and the position of the second optical system in the second direction with respect to the base frame.

Feature 7

The lens unit according to Feature 5 or 6, wherein the adjustment mechanism has a first lens holder to which the first optical system is mounted, and a first support component that is linked to the base frame and supports the first lens holder movably in the first direction with respect to the base frame.

Feature 8

The lens unit according to Feature 7, wherein the first support component supports the first lens holder so as to move in the first direction while rotating around the first optical axis with respect to the base frame.

Feature 9

The lens unit according to Feature 8, wherein the first lens holder has a first holder main body to which the first optical system is mounted and which is supported movably in the first direction and rotatably around the first optical axis b the first support component, and a first follower that is linked to the first holder main body and is guided by the first support component.

Feature 10

The lens unit according to Feature 9, wherein the first support component has a first front guide face that is inclined with respect to the first optical axis, and a first rear guide face that is disposed on the opposite side from the first front guide face in the first direction and is inclined with respect to the first optical axis, and the first follower has a first front protrusion that is linked to the first holder main body and comes into slidable contact with the first front guide face, and a first rear protrusion that is linked to the first holder main body and comes into slidable contact with the first rear guide face.

Feature 11

The lens unit according to Feature 10, wherein the first support component is sandwiched by the first front protrusion and the first rear protrusion in the first direction.

Feature 12

The lens unit according to any of Features 9 to 11, wherein the first support component has a first receiver that comes into contact with the outer peripheral face of the first holder main body, and a first presser that presses the first holder main body against the first receiver.

Feature 13

The lens unit according to any of Features 9 to 12, wherein the first lens holder has a first rotationally driven component that is linked to the first holder main body in order to adjust the position of the first holder main body in the rotational direction around the first optical axis with respect to the base frame.

Feature 14

The lens unit according to any of Features 7 to 13, wherein the adjustment mechanism has a second lens holder to which the second optical system is mounted, and a second support component that is linked to the base frame and supports the second lens holder movably in the second direction with respect to the base frame.

Feature 15

The lens unit according to Feature 14, wherein the second support component supports the second lens holder so as to rotate around the second optical axis with respect to the base frame while moving in the second direction.

Feature 16

The lens unit according to Feature 15, wherein the second lens holder has a second holder main body to which the second optical system is mounted and which is supported movably in the second direction and rotatably around the second optical axis by the second support component, and a second follower that is linked to the second holder main body and is guided by the second support component.

Feature 17

The lens unit according to Feature 16, wherein the second support component has a second front guide face that is inclined with respect to the second optical axis, and a second rear guide face that is disposed on the opposite side from the second front guide face in the second direction and is inclined with respect to the second optical axis, and the second follower has a second front protrusion that is linked to the second holder main body and comes into slidable contact with the second front guide face, and a second rear protrusion that is linked to the second holder main body and comes into slidable contact with the second rear guide face.

Feature 18

The lens unit according to Feature 17, wherein the second support component is sandwiched in the second direction by the second front protrusion and the second rear protrusion.

Feature 19

The lens unit according to any of Features 16 to 18 wherein the second support component has a second receiver that comes into contact with the outer peripheral face of the second holder main body, and a second presser that presses the second holder main body against the second receiver.

Feature 20

The lens unit according to any of Features 16 to 19, wherein the second lens holder has a second rotationally driven component that is linked to the second holder main body in order to adjust the position of the second holder main body in the rotational direction around the second optical axis with respect to the lens frame.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," "unit" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens unit or an imaging device equipped with the lens unit. Accordingly, these terms, as utilized to describe the present invention should be interpreted relative to the lens unit or an imaging device equipped with the lens unit.

The term "configured" as used herein to describe a component, section, or part of a device includes hardware and/or software that is constructed and/or programmed to carry out the desired function.

The terms of degree such as “substantially”, “about” and “approximately” as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A lens unit, comprising:

an optical system having at least one lens;

a lens holder supporting the optical system; and a lens frame having a guide component, the guide component guiding a movement of the lens holder in a first direction, the lens holder having a first portion and a second portion, the first portion being disposed slidably over the guide component, and the second portion being disposed slidably over the guide component and disposed spaced apart from the first portion in the first direction, and the guide component being sandwiched between the first portion and the second portion by an elastic force of the first portion and/or the second portion;

wherein the lens holder has a holder main body, the optical system being mounted to the holder main body, and the holder main body being supported movably in the first direction and rotatably around the first optical axis by the lens frame, the first portion protruding from the holder main body, and the second portion protruding from the holder main body.

2. The lens unit according to claim 1, wherein the guide component has a first guide face and a second guide face, the first guide face being inclined with respect to the optical axis, and the second guide face facing the first guide face in the first direction and being inclined with respect to the optical axis, the first portion being in slidable contact with the first guide face, and the second portion being in slidable contact with the second guide face.

3. The lens unit according to claim 2, wherein the lens frame has a receiver and a presser, the receiver coming into contact with an outer peripheral face of the lens holder, and the presser pressing the lens holder against the receiver.

* * * * *